US012645945B1

(12) United States Patent
Cohen et al.

(10) Patent No.: US 12,645,945 B1
(45) Date of Patent: Jun. 2, 2026

(54) MULTI-TIERED HIERARCHICAL LANGUAGE MODEL JUDGING SYSTEM FOR EFFICIENT AND ACCURATE MODEL EVALUATION

(71) Applicant: Intuit Inc., Mountain View, CA (US)

(72) Inventors: Linoy Cohen, New York, NY (US); Yakov Gazman, Hamadia (IL); Tom Klein, Tel Aviv (IL); Shon Mendelson, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/286,686

(22) Filed: Jul. 31, 2025

(51) Int. Cl.
*G06N 3/09* (2023.01)
*G06F 18/22* (2023.01)

(52) U.S. Cl.
CPC ............... *G06N 3/09* (2023.01); *G06F 18/22* (2023.01)

(58) Field of Classification Search
None
See application file for complete search history.

(56) References Cited

U.S. PATENT DOCUMENTS

| | | | |
|---|---|---|---|
| 2025/0111220 A1* | 4/2025 | Jones | G06N 3/08 |
| 2025/0124067 A1* | 4/2025 | Qin | G06F 16/338 |
| 2025/0190460 A1* | 6/2025 | Madisetti | G06F 16/3329 |

OTHER PUBLICATIONS

Jiang et al ("CASCADIA: A Cascade Serving System for Large Language Models" Jun. 2025) (Year: 2025).*
Dekoninck et al ("A Unified Approach to Routing and Cascading for LLMs" May 2025) (Year: 2025).*
Zellinger et al ("Rational Tuning of LLM Cascades via Probabilistic Modeling" Jan. 2025) (Year: 2025).*
Chen et al ("Harnessing Multiple Large Language Models: A Survey on LLM Ensemble" Feb. 2025) (Year: 2025).*

* cited by examiner

*Primary Examiner* — Lut Wong
(74) *Attorney, Agent, or Firm* — Dinsmore & Shohl LLP

(57) ABSTRACT

Disclosed herein are system, method, apparatus, and computer-readable medium embodiments for a multi-tiered hierarchical language model judging system for efficient and accurate model evaluation. A system receives a first text string specifying a question from a first user interface and a second text string specifying an answer generated by a language model. The system receives, from a first model, a first token probability for the second set of one or more tokens and generates a first confidence score. Based on the first confidence score satisfying a threshold, the system outputs the second text string and the first confidence score to the user interface. If the first confidence score fails to satisfy the threshold, the system outputs the second text string and one of a second confidence score generated based on a second token probability from a second model or a third confidence score generated by a reasoning model.

20 Claims, 14 Drawing Sheets

Muti-Tiered Judging System (200)

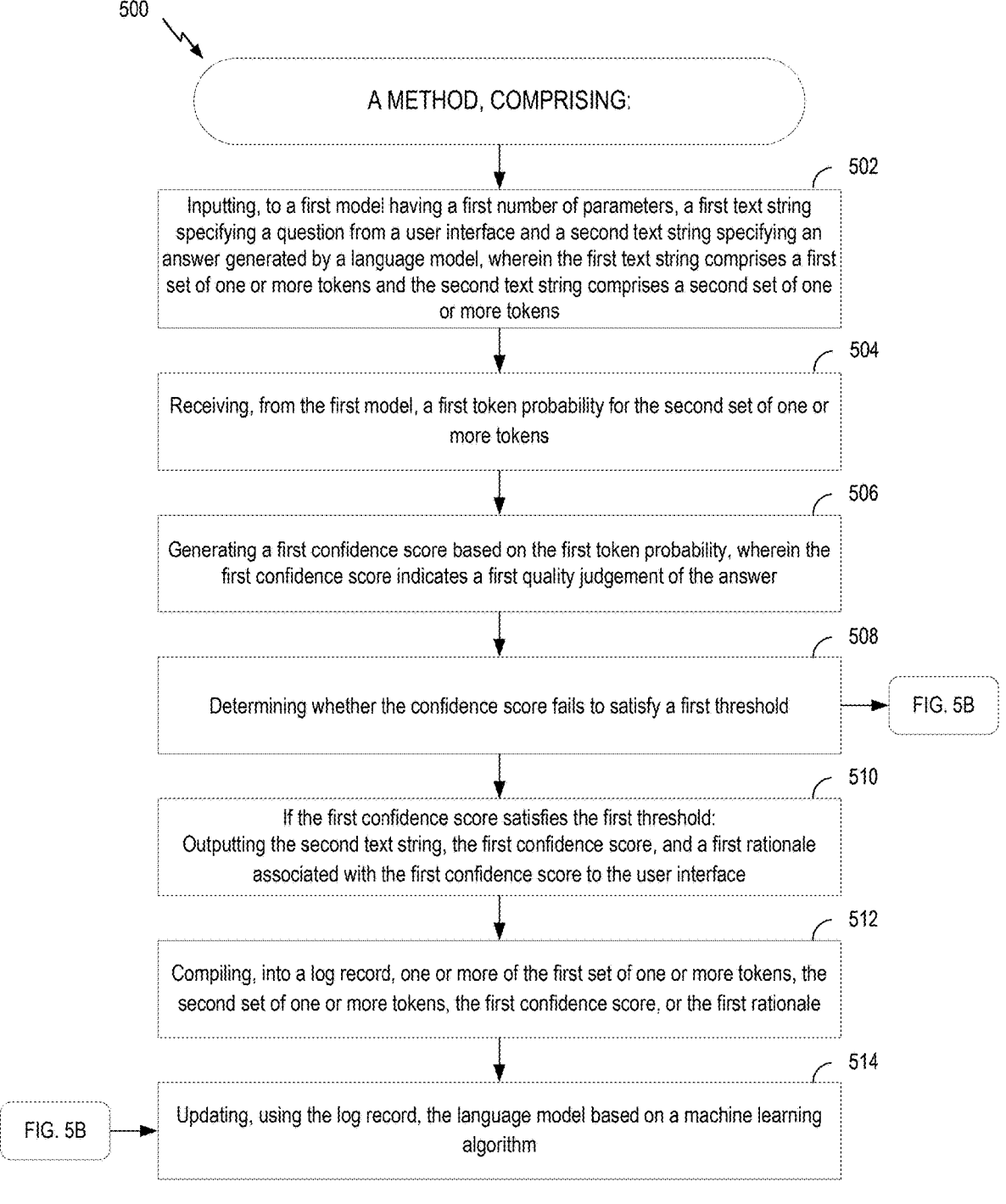

500

A METHOD, COMPRISING:

502

Inputting, to a first model having a first number of parameters, a first text string specifying a question from a user interface and a second text string specifying an answer generated by a language model, wherein the first text string comprises a first set of one or more tokens and the second text string comprises a second set of one or more tokens

504

Receiving, from the first model, a first token probability for the second set of one or more tokens

506

Generating a first confidence score based on the first token probability, wherein the first confidence score indicates a first quality judgement of the answer

508

Determining whether the confidence score fails to satisfy a first threshold   →  FIG. 5B

510

If the first confidence score satisfies the first threshold:
Outputting the second text string, the first confidence score, and a first rationale associated with the first confidence score to the user interface

512

Compiling, into a log record, one or more of the first set of one or more tokens, the second set of one or more tokens, the first confidence score, or the first rationale

514

FIG. 5B   →  Updating, using the log record, the language model based on a machine learning algorithm

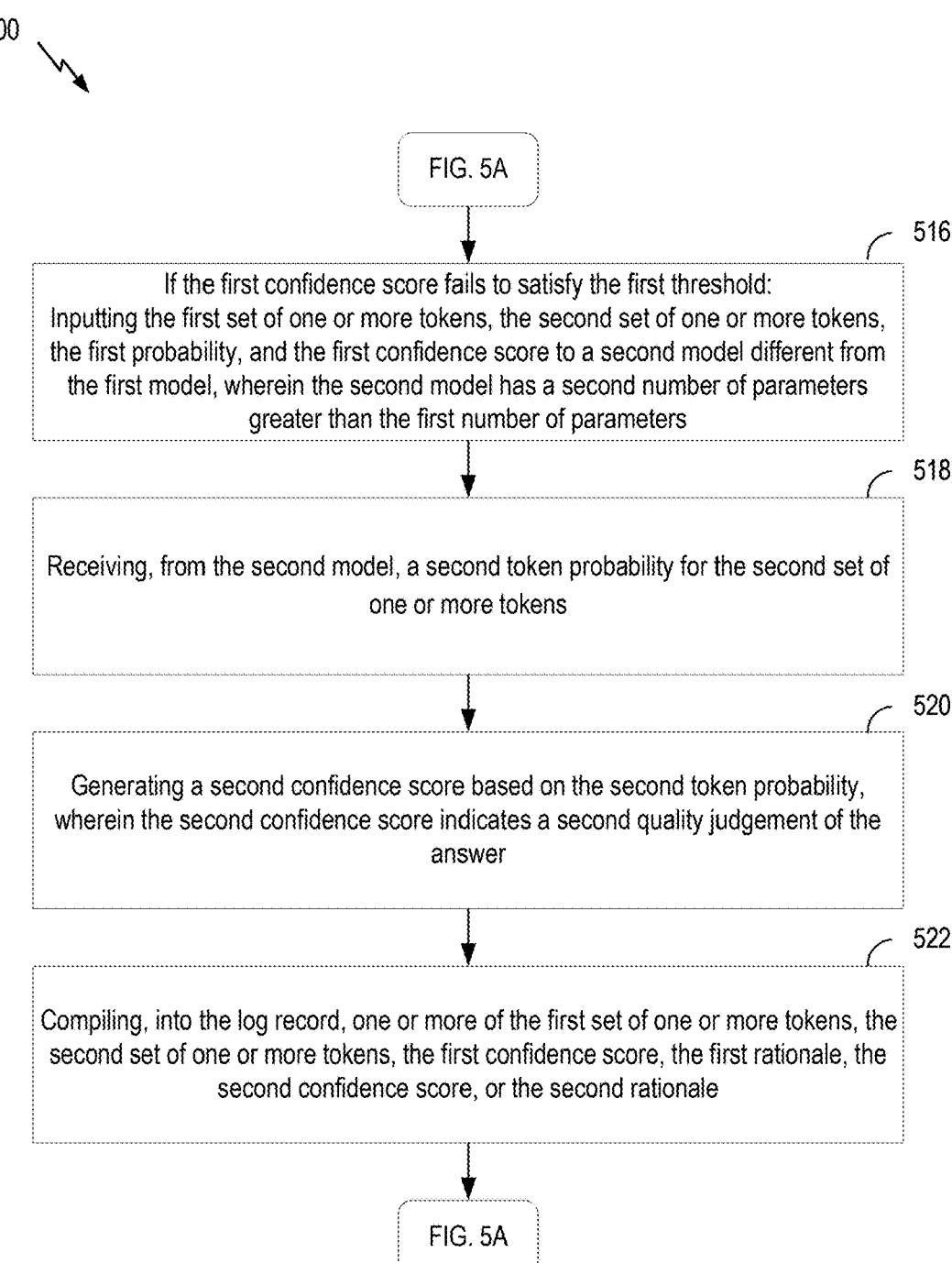

FIG. 5A

516
If the first confidence score fails to satisfy the first threshold:
Inputting the first set of one or more tokens, the second set of one or more tokens, the first probability, and the first confidence score to a second model different from the first model, wherein the second model has a second number of parameters greater than the first number of parameters 518
Receiving, from the second model, a second token probability for the second set of one or more tokens 520
Generating a second confidence score based on the second token probability, wherein the second confidence score indicates a second quality judgement of the answer 522
Compiling, into the log record, one or more of the first set of one or more tokens, the second set of one or more tokens, the first confidence score, the first rationale, the second confidence score, or the second rationale

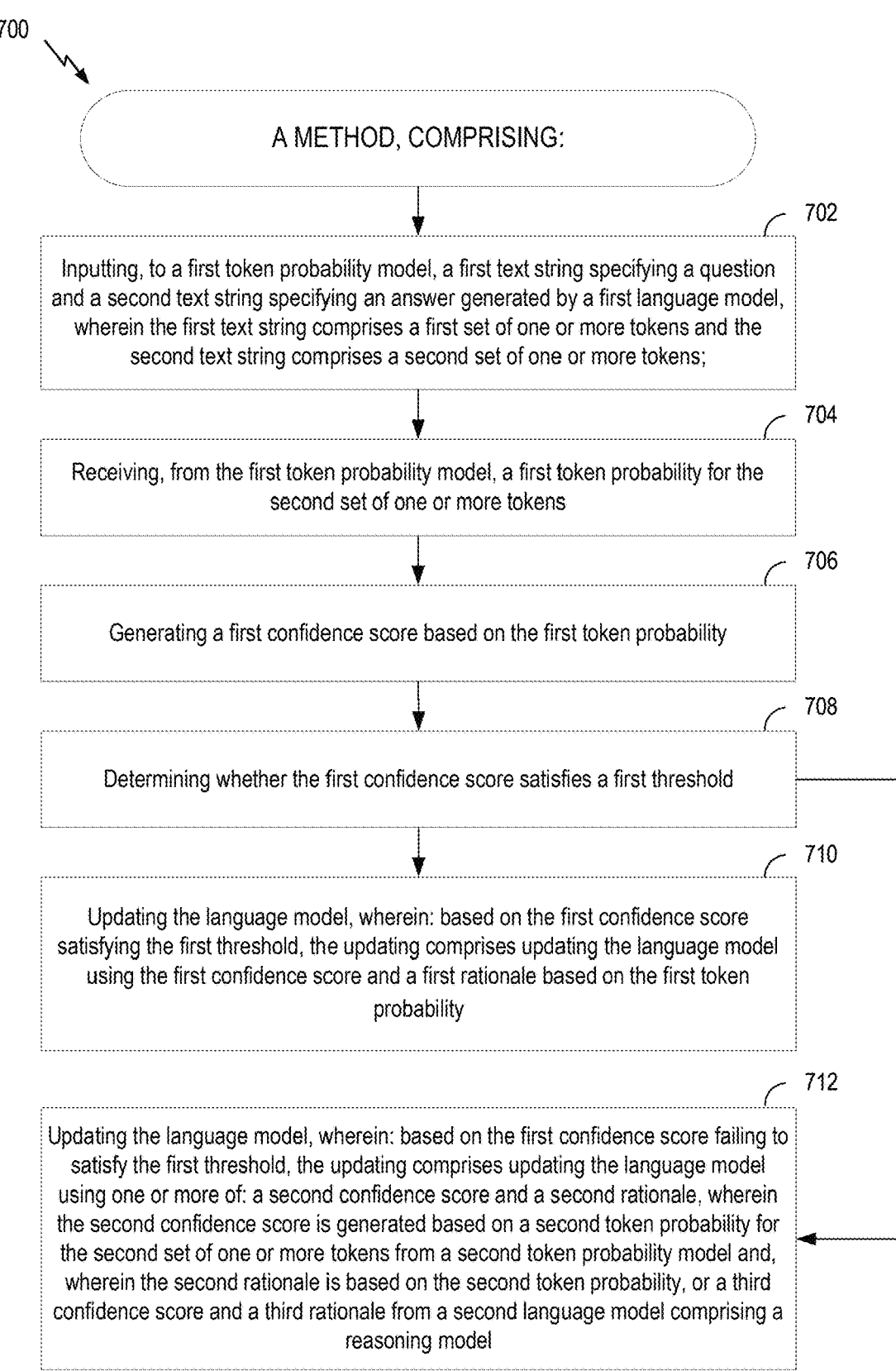

A METHOD, COMPRISING:

702

Inputting, to a first token probability model, a first text string specifying a question and a second text string specifying an answer generated by a first language model, wherein the first text string comprises a first set of one or more tokens and the second text string comprises a second set of one or more tokens;

704

Receiving, from the first token probability model, a first token probability for the second set of one or more tokens

706

Generating a first confidence score based on the first token probability

708

Determining whether the first confidence score satisfies a first threshold

710

Updating the language model, wherein: based on the first confidence score satisfying the first threshold, the updating comprises updating the language model using the first confidence score and a first rationale based on the first token probability

712

Updating the language model, wherein: based on the first confidence score failing to satisfy the first threshold, the updating comprises updating the language model using one or more of: a second confidence score and a second rationale, wherein the second confidence score is generated based on a second token probability for the second set of one or more tokens from a second token probability model and, wherein the second rationale is based on the second token probability, or a third confidence score and a third rationale from a second language model comprising a reasoning model

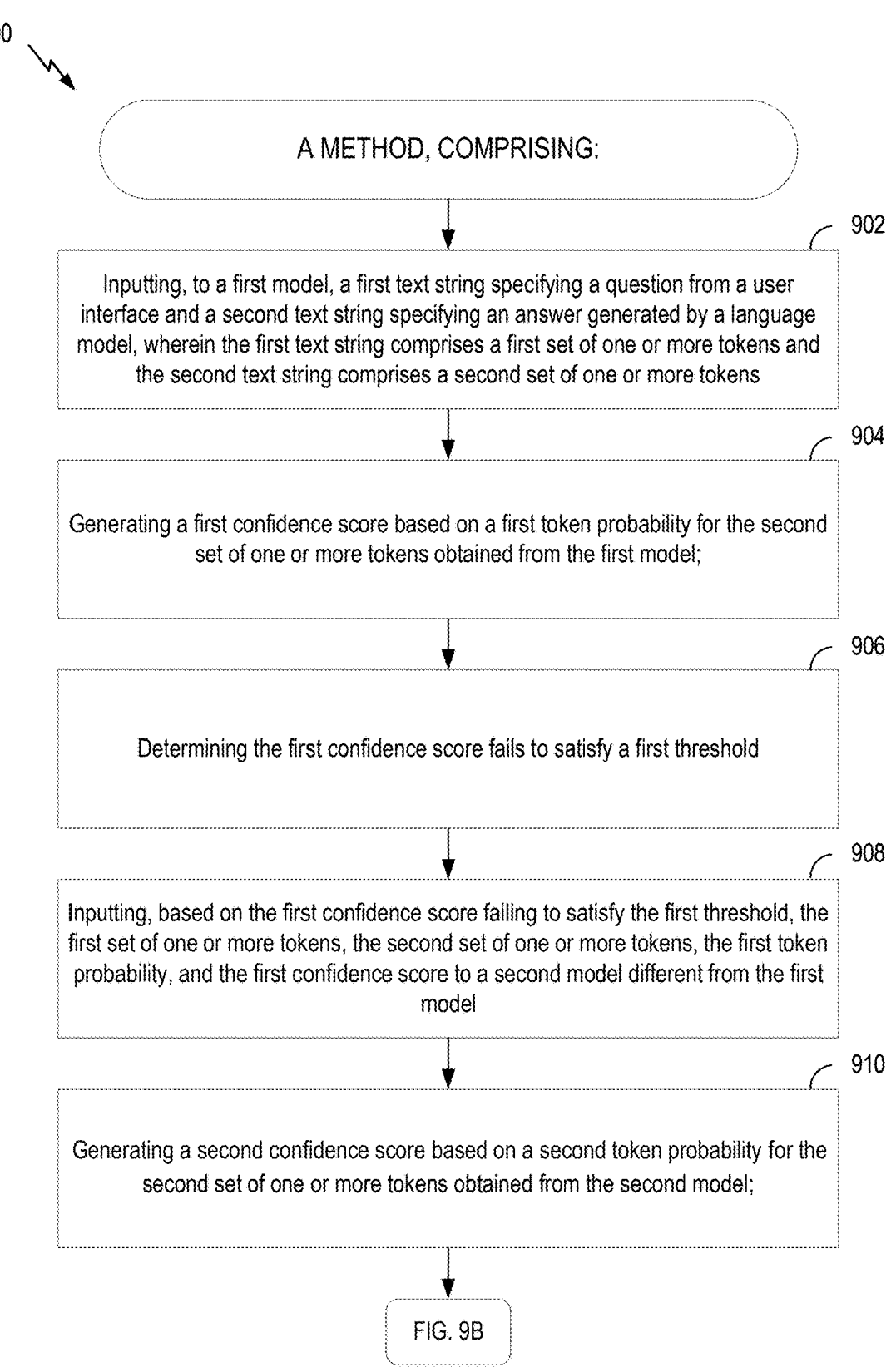

A METHOD, COMPRISING:

902

Inputting, to a first model, a first text string specifying a question from a user interface and a second text string specifying an answer generated by a language model, wherein the first text string comprises a first set of one or more tokens and the second text string comprises a second set of one or more tokens

904

Generating a first confidence score based on a first token probability for the second set of one or more tokens obtained from the first model;

906

Determining the first confidence score fails to satisfy a first threshold

908

Inputting, based on the first confidence score failing to satisfy the first threshold, the first set of one or more tokens, the second set of one or more tokens, the first token probability, and the first confidence score to a second model different from the first model

910

Generating a second confidence score based on a second token probability for the second set of one or more tokens obtained from the second model;

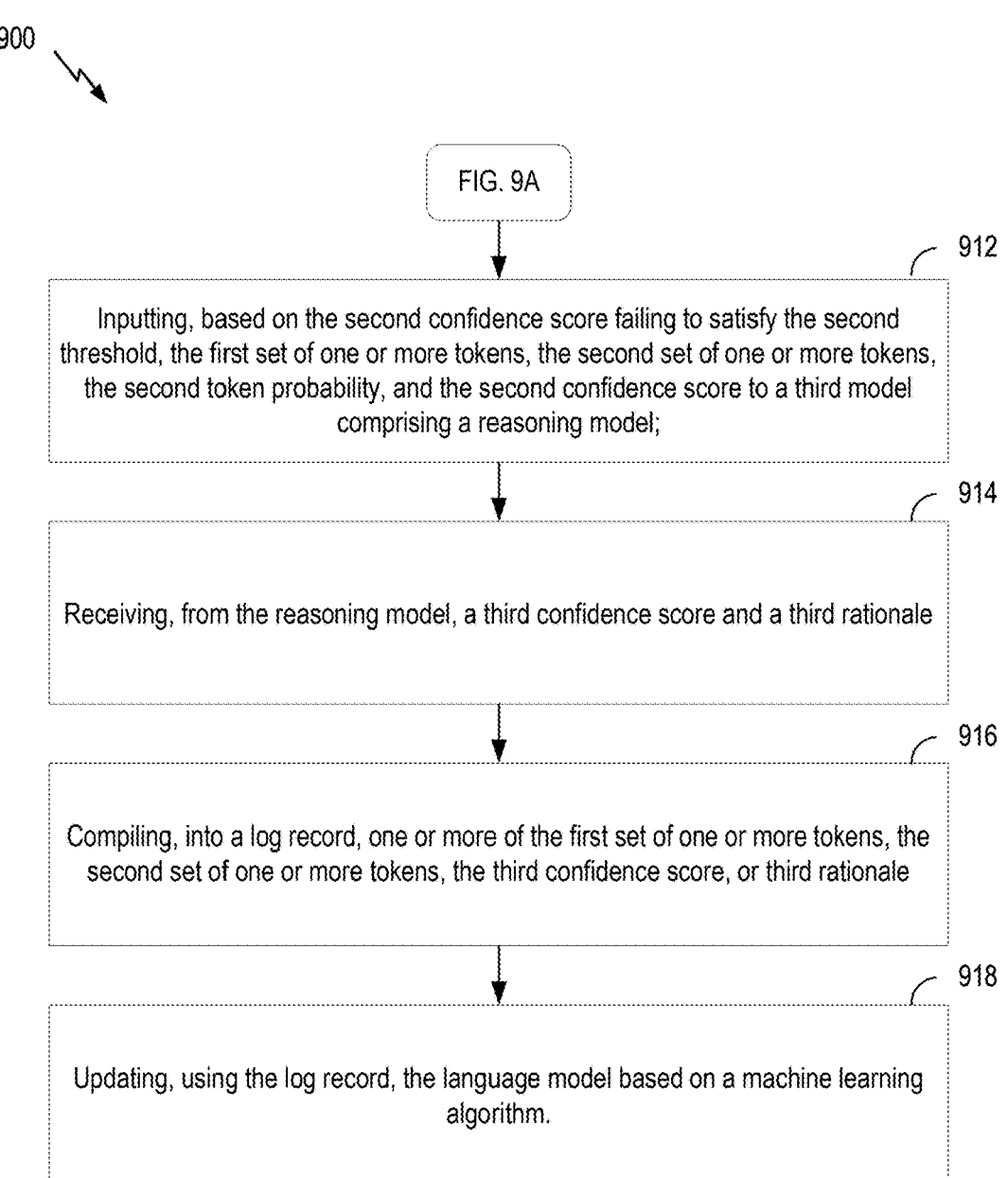

Inputting, based on the second confidence score failing to satisfy the second threshold, the first set of one or more tokens, the second set of one or more tokens, the second token probability, and the second confidence score to a third model comprising a reasoning model;

914

Receiving, from the reasoning model, a third confidence score and a third rationale

916

Compiling, into a log record, one or more of the first set of one or more tokens, the second set of one or more tokens, the third confidence score, or third rationale

918

Updating, using the log record, the language model based on a machine learning algorithm.

*FIG. 9B*

MULTI-TIERED HIERARCHICAL LANGUAGE MODEL JUDGING SYSTEM FOR EFFICIENT AND ACCURATE MODEL EVALUATION

BACKGROUND

Field

Aspects of the present disclosure relate to the efficient and accurate judging of responses generated by large language models.

Description of Related Art

A long-term goal of artificial intelligence (AI) is to create machines capable of understanding and engaging in conversation with humans using natural language. Dialogue systems, which can communicate with users in natural language, may conduct unstructured conversations, with users, on any topic (e.g., open-domain systems). Performant dialogue systems exhibit competence in understanding natural language, making informed decisions, and generating fluent, engaging, contextually appropriate, and accurate responses.

An example dialogue system may leverage language models, such as large language models (LLMs) or small language models (SLMs), to perform natural language processing (NLP) tasks. A language model is a type of machine learning (ML) model that supports NLP tasks, such as generating text, analyzing sentiments, answering user queries in a conversational manner, translating text from one language to another, and/or the like. Language models make it possible for software to "understand" typical human speech or written content and respond to it by, in some cases, generating human-understandable responses through natural language generation (NLG). An LLM is a type of language model that uses deep learning techniques to understand and autonomously generate text like a human. LLMs typically have a large number of parameters (e.g., billions or, in some cases, trillions) that can be adjusted to optimize the process of tokenizing words into tokens and predicting the next token from a previous sequence of input tokens.

A popular LLM model architecture is a generative pre-trained transformer (GPT) model. A GPT model is a specific type of LLM based on a transformer architecture (e.g., architecture that uses an encoder-decoder structure and does not rely on recurrence and/or convolutions to generate an output), that is pre-trained in a generative and unsupervised manner (e.g., it learns from data without being given explicit instructions on what to learn). A GPT model analyzes prompts and predicts the best possible response based on their understanding of the language. In particular, the GPT model may rely on the knowledge it gains after its parameters are trained on massive datasets. As used herein a "prompt," is a specific instruction and/or request, posed in natural language, given to a computer program and/or language model to perform a particular task and/or generate a specific output.

SUMMARY

Certain aspects provide a computer-implemented method of inputting, to a first model having a first number of parameters, a first text string specifying a question from a user interface and a second text string specifying an answer generated by a language model, wherein the first text string comprises a first set of one or more tokens and the second text string comprises a second set of one or more tokens; receiving, from the first model, a first token probability for the second set of one or more tokens; generating a first confidence score based on the first token probability, wherein the first confidence score indicates a first quality judgement of the answer; determining whether the first confidence score satisfies a first threshold; if the first confidence score satisfies the first threshold: outputting the second text string, the first confidence score, and a first rationale associated with the first confidence score to the user interface, and compiling, into a log record, one or more of the first set of one or more tokens, the second set of one or more tokens, the first confidence score, or the first rationale, or if the first confidence score fails to satisfy the first threshold: inputting the first set of one or more tokens, the second set of one or more tokens, the first token probability, and the first confidence score to a second model different from the first model, wherein the second model has a second number of parameters greater than the first number of parameters, receiving, from the second model, a second token probability for the second set of one or more tokens, generating a second confidence score based on the second token probability, wherein the second confidence score indicates a second quality judgement of the answer, and compiling, into the log record, one or more of the first set of one or more tokens, the second set of one or more tokens, the second confidence score, or the second rationale; and updating, using the log record, the language model based on a machine learning algorithm.

Certain aspects provide an apparatus comprising one or more processors and one or more memories coupled with the one or more processors and configured to cause the processing system to: input, to a first token probability model, a first text string specifying a question and a second text string specifying an answer generated by a first language model, wherein the first text string comprises a first set of one or more tokens and the second text string comprises a second set of one or more tokens; receive, from the first token probability model, a first token probability for the first set of one or more tokens; generate a first confidence score based on the first token probability; determine whether the first confidence score satisfies a first threshold; and update the language model, wherein the processing system is configured to: based on the first confidence score satisfying the first threshold, update the language model using the first confidence score and a first rationale based on the first token probability, or based on the first confidence score failing to satisfy the first threshold, update the language model using one or more of: a second confidence score and a second rationale, wherein the second confidence score is generated based on a second token probability for the second set of one or more tokens from a second token probability model and, wherein the second rationale is based on the second token probability, or a third confidence score and a third rationale from a second language model comprising a reasoning model.

Certain aspects provide a computer-implemented method of inputting, to a first model, a first text string specifying a question from a user interface and a second text string specifying an answer generated by a language model, wherein the first text string comprises a first set of one or more tokens and the second text string comprises a second set of one or more tokens; generating a first confidence score based on a first token probability for the second set of one or more tokens obtained from the first model; determining the first confidence score fails to satisfy a first threshold; inputting, based on the first confidence score failing to satisfy the first threshold, the first set of one or more tokens, the second set of one or more tokens, the first token probability, and the first confidence score to a second model different from the first model; generating a second confidence score based on a second token probability for the second set of one or more tokens obtained from the second model; determining the second confidence score fails to satisfy a second threshold; inputting, based on the second confidence score failing to satisfy the second threshold, the first set of one or more tokens, the second set of one or more tokens, the second token probability, and the second confidence score to a third model comprising a reasoning model; receiving, from the reasoning model, a third confidence score and a third rationale; compiling, into a log record, one or more of the first set of one or more tokens, the second set of one or more tokens, the third confidence score, or third rationale; and updating, using the log record, the language model based on a machine learning algorithm.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIGS. 5A and 5B illustrate an example method for providing multi-tiered hierarchical language model judging, in accordance with aspects of the disclosure.

FIG. 7 illustrates an example method for providing multi-tiered hierarchical language model judging, in accordance with aspects of the disclosure.

FIGS. 9A and 9B illustrate an example method for providing multi-tiered hierarchical language model judging, in accordance with aspects of the disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
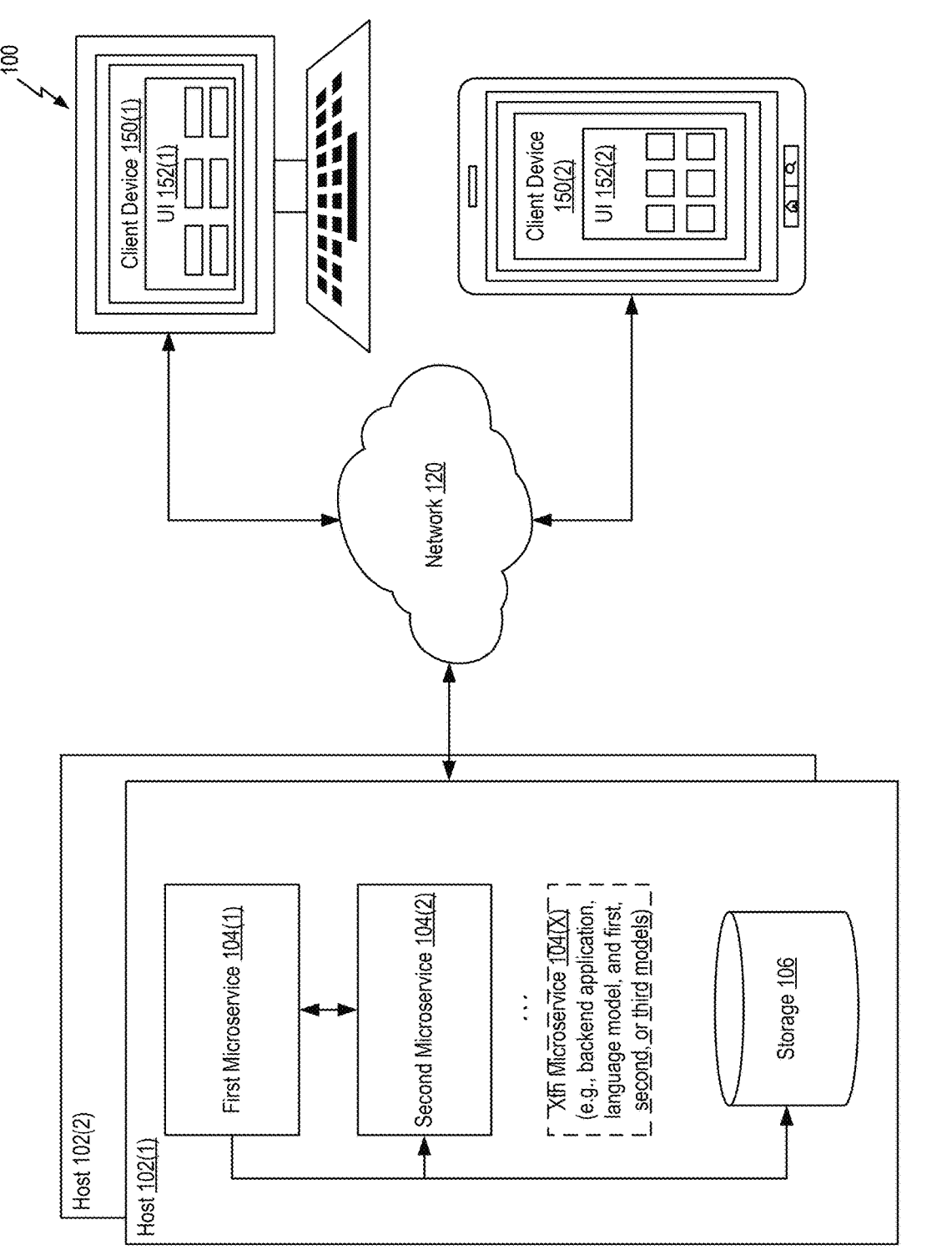
FIG. 1 illustrates an exemplary computing environment, in accordance with aspects of the disclosure.

Aspects of the present disclosure provide apparatuses, methods, processing systems, and computer-readable mediums for a multi-tiered hierarchical language model judging system for efficient and accurate model evaluation.

Large language models (LLMs) are deep learning models that are designed to understand and autonomously generate text like a human. LLMs rely on a transformer neural network architecture comprising multiple layers of neural networks, where each node, or computational unit, in a neural network layer is connected to all nodes in subsequent neural network layers, and connections between nodes are associated with parameters, such as weights and biases that influence the output of other connected nodes. Transformer neural network architecture may allow for exceptionally large models that consist of hundreds of billions of parameters and are capable of ingesting massive amounts of data from various sources from which they are able to learn grammar, semantics, and conceptual relationships. During training, an LLM tokenizes words into tokens, transforms the tokens into embeddings (e.g., numeric representations of their context), and iteratively adjusts parameter values until the model correctly predicts the next token from a previous sequence of input tokens. The LLM may further apply self-learning techniques which teach the model to adjust parameters to maximize the likelihood of the next tokens in training examples.

Once trained, an LLM may be further updated or fine-tuned to improve its accuracy. However, the decision to do so often requires an evaluation of the correctness and quality of LLM responses. One way to evaluate LLM responses is to use a second LLM as a judge. Although this approach provides for high accuracy, using large, powerful models solely for evaluation is not only computationally expensive and time-consuming, but is also impractical to implement at the scale necessary to provide real-time evaluation for numerous user interactions during post-production monitoring. Another way to judge LLM responses is to perform simpler checks using lightweight models, which may produce faster, yet less reliable, judgments that miss nuances that a larger, more powerful model would not. Often, additional computing resources may be required to address shortcomings in a lightweight model's analysis. Accordingly, a single one-size-fits-all approach to evaluating every response generated by an LLM may not lead to an ideal distribution of computing resources. Individual users and organizations may benefit from a flexible system that can provide quick and reliable judgments for most LLM-generated answers and, when necessary, escalate complex or uncertain evaluations to more capable models.

Aspects described herein provide techniques and apparatuses to achieve a balance between speed and cost savings via smaller models for most tasks and high accuracy via larger models when needed. For example, aspects described herein provide for the output of a language model (such as an LLM) to be evaluated by increasingly capable or complex models. Each of these models may output a confidence score, for example, based on a token probability. If the confidence score satisfies a threshold, then the output may be accepted without further analysis. However, if the confidence score fails to satisfy the threshold, then the output may be "escalated" to a more complex model, which may also output a confidence score regarding the output. This may continue through a highest-capability model, which may include a reasoning model.

For example, certain aspects of the present disclosure may include a backend application that inputs a question and its corresponding answer, which may comprise a text string produced by a language model in response to receiving the question from a user, to a first token probability model. Based on a first token probability provided by the first token probability model, the backend application generates a first confidence score that indicates a first quality judgment of the answer and a first rationale associated with the first confidence score. The backend application determines whether the first confidence score satisfies a first threshold. When the first confidence score fails to satisfy the first threshold, the backend application inputs one or more of the question, the answer, the first token probability, the first confidence score, or the first rationale to a second token probability model that has greater number of parameters than the first token probability model. The backend application also generates a second confidence score, indicating a second quality judgment of the answer, along with a second rationale associated with the second confidence score based on the second token probability obtained from the second token probability model.

In some aspects, the backend application further determines whether the second confidence score satisfies a second threshold. When the second confidence score fails to satisfy a second threshold, the backend application inputs one or more of the question, the answer, the second token probability, or the second confidence score to a third model comprising a second language model or a reasoning model. In some aspects, the third model is configured to generate a third confidence score indicative of a third quality judgment of the answer and a third rationale associated with the third confidence score. Since the third model is the largest, most capable model, the third confidence score or third rationale may be the final, highest-level assessment of the answer generated by the initial language model. Accordingly, upon receiving a third confidence score and a third rationale from the third model, the backend application displays the answer, the third confidence score, and the third rationale on a user interface.

Furthermore, the aspects described herein provide for compiling the confidence score and the rationale associated with the confidence score that are generated at each level or tier into a log record. Additionally, the aspects described also provide for using the log record to update the language model based on a machine learning algorithm.

Certain techniques for providing a multi-tiered hierarchical language model judging system described herein may provide beneficial technical effects and advantages. For example, a multi-tiered hierarchical language model judging system may provide rapid, yet highly accurate, judgments of LLM-generated answers in a manner that promotes the efficient use of available computing resources. Such technical effects may be attributable to techniques and apparatuses described herein, for example, due to the backend application generating a first confidence score based on a first token probability for a tokenized representation of a text string specifying an answer (e.g., second set of one or more tokens) from a first, lightweight model. As will be described in further detail below, the first model can generate quality judgments with sufficient confidence for most LLM-generated answers that are presented to it. Should the first model produce a quality judgment for an LLM-generated answer that fails to meet a defined confidence threshold, the backend application may escalate the LLM-generated answer to a second, and potentially a third, larger and more capable model for further evaluation. In some aspects, the second model may be a second token probability model that has a greater number of parameters than the first token probability model, and the third model may be a second LLM. The incremental application of more powerful models to LLM-generated answers with uncertain evaluations, in lieu of simply applying the most capable model to every LLM-generated answer, increases the likelihood of a high-confidence response while promoting efficient use of available computing resources.

Example Environment for a Multi-Tiered Hierarchical Language Model Judging System FIG. 1 depicts an example computing environment 100 supporting a plurality of microservices 104 (e.g., software-defined services, which in some cases, may be cloud-native). As shown in FIG. 1, system 100 includes client devices 150(1)-(2) (collectively referred to herein as "client device 150") and hosts 102(1)-(2) (collectively referred to herein as "host 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. Microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure. Microservices 104(X) may specifically implement elements of the multi-tiered language model judging system such as, but not limited to, a backend application, a language model, a first model, a second model, and a third model. The backend application, the language model, and the first, second, and third models will be discussed in further detail with respect to FIG. 2.

Client device 150 may be a desktop computer, laptop computer, tablet computer, smartphone, cellular telephone, personal digital assistant, or any other type of computing device. User interface 152 may comprise a graphical user interface (GUI) of a software application operating on client device 152. Software applications may include web browser applications that enable users to access content and resources located on remote servers using network 120.

Some examples of web browser applications may include Google Chrome™, Mozilla Firefox™, Microsoft Edge™, Opera™, and Apple Safari™.

User interface 152 may comprise one or more GUI elements including, but are not limited to, an input element, a submission element, and an output element. The input element may be configured to receive distinct types of user-provided data including, but not limited to, one or more text strings, one or more audio files, or one or more image files. In some aspects, the one or more text strings may specify a search query or question that the user would like to have answered. The input element may be configured to receive the user-provided data from an input device such as keyboard, camera, microphone, or a voice-to-text program. The submission element may be a button (or other type of GUI element) configured to cause the user interface 152 to transmit the user-provided data to a microservice (e.g., one of the microservices 104 on host 102). The user interface 152 may transmit the user-provided data to the microservice instantly upon, or shortly after, receiving an indication of user interaction (e.g., click, toggle, etc.) with the submission element. The output element may be configured to receive and display a response from the microservice. A response may be a relevant, existing content item retrieved from a database by the microservice or a new content item generated by the microservice based on user-provided data, such as one or more text strings specifying an answer to a question previously posed by the user.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Figure 2:
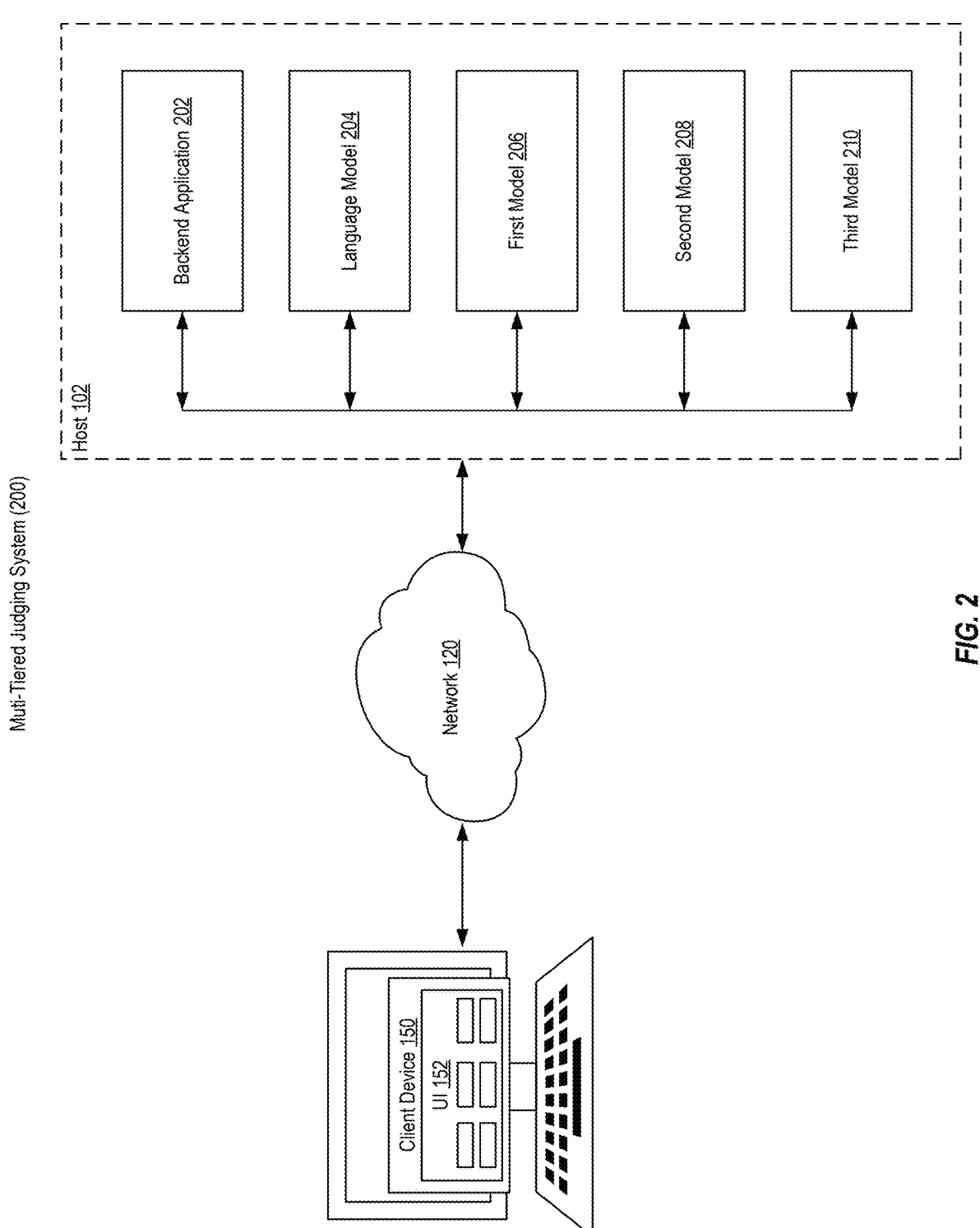
FIG. 2 illustrates an example system for providing multi-tiered hierarchical language model judging, in accordance with aspects of the disclosure.

FIG. 2 illustrates an example system 200 for providing multi-tiered hierarchical language model judging, in accordance with aspects of the disclosure. The example system 200 may comprise a backend application 202, a language model 204, a first model 206, a second model 208, and a third model 210. As shown in FIG. 2, the backend application 202, the language model 204, the first model 206, the second model 208, and the third model 210 may be implemented as microservices (e.g., microservice 104) on host 102. Communication between the microservices on host 102 as well as between the user interface 152 and a microservice may be facilitated by one or more APIs.

Backend application 202 is configured to receive user-provided data from the user-interface 152 and forward the user-provided data to the language model 204. As previously described, the user-provided data may include distinct types of data such as, but not limited to, one or more text strings, one or more audio files, or one or more image files. The backend application 202 further receives, from the language model 204, a new content item that the language model 204 generates based on the user-provided data. Like the user-provided data, a content item generated by language model 204 may comprise one or more text strings, one or more audio files, or one or more image files. In some aspects, the user-provided data may comprise a first text string specifying a question or a task prompt and the new content item may comprise a second text string specifying a response to the question or the task prompt. Furthermore, in some aspects, the backend application 202 is configured to tokenize the first text string and the second text string into a first set of one or more tokens and a second set of one or more tokens, respectively. In other aspects, the backend application 202 alternatively receives tokenized representations of the first text string (e.g., a first set of one or more tokens) and the second text string (e.g., a second set of one or more tokens) from the language model 204.

The backend application 202 is configured to assess the quality or trustworthiness of a second text string by submitting the first set of one or more tokens and the second set of one or more tokens to one or more of the first model 206, the second model 208, or the third model 210. In some aspects, the backend application 204 receives a confidence score for the second set of one or more tokens from at least one of the first model 206, the second model 208, and the third model 210. Alternatively, in other aspects, the backend application 204 instead receives intermediate data that the backend application 202 may use to generate a confidence score for the second text string from at least one of the first model 206, the second model 208, or the third model 210. Intermediate data may include a token probability for the second set of one or more tokens. A token probability may comprise a plurality of values, wherein each value represents a likelihood that a corresponding token in the second set of one or more tokens will be the next token in a sequence of tokens given the preceding tokens. In some aspects, the backend application 202 may derive a confidence score for the second text string by computing an average log-likelihood of the plurality of values in the token probability. An average log-likelihood provides a useful measure of how good a model (e.g., the first model 206 or the second model 208) is at estimating the probability that each token in the second set of one or more tokens will be the next token in a sequence of tokens given the tokens that preceded it. An average log-likelihood may be calculated using a token probability for the second set of one or more tokens as follows:

$$L = \left(\frac{1}{n}\right) * \sum_{i=1}^{n} (\log(Pi)) \tag{Eq. 1}$$

Where n is the number of tokens in the second set of one or more tokens, i is a token in the second set of one or more tokens, and $P_i$ is the probability or likelihood that the token, i, will be the next token in a sequence of tokens given the preceding tokens. In other aspects, the backend application may alternatively derive a confidence score for the second text string by computing a perplexity score based on the plurality of values in the token probability. A perplexity score captures the degree of uncertainty a model (e.g., the first model 206 or the second model 208) has when assigning probabilities to tokens in the second set of one or more tokens. The lower the perplexity score, the more certain the model is at assigning a probability to a token. A perplexity score may be calculated using a token probability for the second set of one or more tokens as follows:

$$PP = \left(1 / \left(\prod_{i}^{n} P_i\right)\right)^{\wedge} (1/n) \tag{Eq. 2}$$

Where n is the number of tokens in the second set of one or more tokens, i is a token in the second set of one or more tokens, and $P_i$ is the probability or likelihood that the token, i, will be the next token in a sequence of tokens given the preceding tokens. In some aspects, the backend application 202 may further translate the perplexity score into a value on a scale from 0 to 1 or 1 to 100.

The backend application 202 may not always obtain a confidence score or intermediate data from each of the first model 206, the second model 208, and the third model 210. The first model 206, the second model 208, and the third model 210 may be organized according to a hierarchy. For example, the backend application 202 may be configured to initially query the first model 206 and receive a first confidence score or compute a first confidence score based on a first token probability from the first model 206. To determine whether to query the second model 208, the backend application 202 compares the first confidence score to a first threshold. The first threshold is a parameter that establishes a minimum acceptable confidence score for the first model 206. The first threshold may be defined manually (e.g., by a user) or automatically by the backend application 202.

If the first confidence score satisfies the first threshold, the backend application 202 determines that no other confidence scores (or evaluation by more sophisticated models such as the second model 208) are necessary. However, if the first confidence score fails to satisfy the first threshold, the backend application 202 submits the first set of one or more tokens and the second set of one or more tokens to the second model 208. Upon receiving a second confidence score or computing a first confidence score based on a second token probability from the second model 208, the backend application 202 compares the second confidence score to a second threshold. The second threshold is a parameter that establishes a minimum acceptable confidence score for the second model 208. The second threshold may be defined manually or automatically by the backend application 202. In some aspects, the second threshold may specify a value equal to the first threshold. If the second confidence score satisfies the second threshold, the backend application 202 may determine that no other confidence scores (or evaluation by more sophisticated models such as the third model 210) are necessary. However, if the second confidence score fails to satisfy the second threshold, the backend application 202 submits the first set of one or more tokens and the second set of one or more tokens to the third model 210. The third model 210 further provides a third confidence score to the backend application 202.

The backend application 202 is configured to output, to the user interface 152, the second text string, and at least one of the first confidence score, the first rationale, the second confidence score, the second rationale, the third confidence score, or the third rationale. For example, when the first confidence score satisfies the first threshold, the backend application 202 may output one or more of the first confidence score or the first rationale along with the second text string. Alternatively, when the first confidence fails to satisfy the first threshold, the backend application 202 may output, to the user interface 152, the second text string and one or more of the second confidence score or the second rationale when the second confidence score satisfies the second threshold, or one or more of the third confidence score or the third rationale when the second confidence score fails to satisfy the second threshold.

The backend application 202 is configured to compile results from one or more of the language model 204, the first model 206, the second model 208, or third model 210 into a log record. In some aspects, the backend application 202 may generate a comprehensive log record that includes the first text string, the second text string, every token probability, as well as every confidence score and associated rationale generated for the second set of one or more tokens. A comprehensive log record storing all intermediate confidence scores may be useful when performing audits or implementing future model improvements. Alternatively, in other aspects, the backend application 202 may store, in the log record, the first text string, the second text string, and the confidence score and associated rationale (which may be received or generated using intermediate data) from the highest-tier model queried. For example, in a scenario where the backend application 202 generated a first confidence score and first rationale based on a first token probability from the first model 206 and a second confidence score and a second rationale based on a second token probability from the second model 208, the backend application 202 may create a log record that only includes the second confidence score and the second rationale in addition to the first and second text strings. By storing results only from the highest-tiered models, non-comprehensive log records are smaller and less computationally complex to work with than comprehensive log records.

Finally, the backend application 202 may be configured to update the language model 204 using the log record based on a machine learning algorithm. In some aspects, the machine learning algorithm may include self-supervised learning or reinforcement learning.

Language model 204 may comprise a large language model (LLM) trained to receive a first text string specifying a question and generate a second text string specifying a response. As previously described, language model 204 may comprise hundreds of billions of parameters, such as more than 100 billion parameters.

The first model 206 may comprise a small, lightweight token probability model having a small number of parameters (e.g., fewer than 10 billion parameters). The first model 206 may be configured to receive tokenized representations of the first text string and second text string (e.g., a first set of one or more tokens and a second set of one or more tokens) and compute a first token probability for the second set of one or more tokens based on the context provided by the first set of one or more tokens. The first token probability may comprise a plurality of values, wherein each value represents the first model 206's estimate of the likelihood that a token in the second set of one or more tokens will be the next token given the preceding sequence of tokens. For example, a value greater than 0.8 for a token in the second set of one or more tokens may indicate that the first model 206 strongly expects that token will be the next token given the preceding sequence of tokens. Alternatively, a value less than 0.1 may suggest that the first model 206 finds the token surprising or uncertain given the context. In some aspects, the first model 206 may transmit the first token probability to the backend application 202 for further computation. In other aspects, the first model 206 may generate a first confidence score based on the first token probability and transmit the first confidence score to the backend application 202. The backend application 202 or the first model 206 may generate a first confidence score by computing an average log-likelihood or a perplexity score using the plurality of values of the first token probability.

The second model 208 may comprise a token probability model having a number of parameters greater than the first model 206 (e.g., greater than 10 billion parameters, greater than 20 billion parameters, etc.). The second model 208 may be configured to receive a first set of one or more tokens and a second set of one or more tokens and compute a second token probability for the second set of one or more tokens based on the context provided by the first set of one or more tokens. Similar to the first token probability, the second token probability may comprise a plurality of values that each represents the second model 208's estimate of the likelihood that a token in the second set of one or more tokens will be the next token in the preceding sequence of tokens. In some aspects, the second model 208 may transmit the second token probability to the backend application 202 for further computation. In other aspects, the second model 208 may generate a second confidence score based on the second token probability and transmit the second confidence score to the backend application 202. The second model 208 may generate a second confidence score by computing an average log-likelihood or perplexity score using the plurality of values of the second token probability.

The third model 210 may comprise a second LLM. In some aspects, the third model 210 may be a reasoning model configured to generate a third confidence score and a third rationale associated with the third confidence score. The third model 210 may further transmit the third confidence score and third rationale to the backend application 202. In some aspects, the third model 210 may also incorporate features such as domain-specific knowledge bases and token-level analytics, to provide the final, highest-level assessment to ensure maximum accuracy.

Figure 3A:
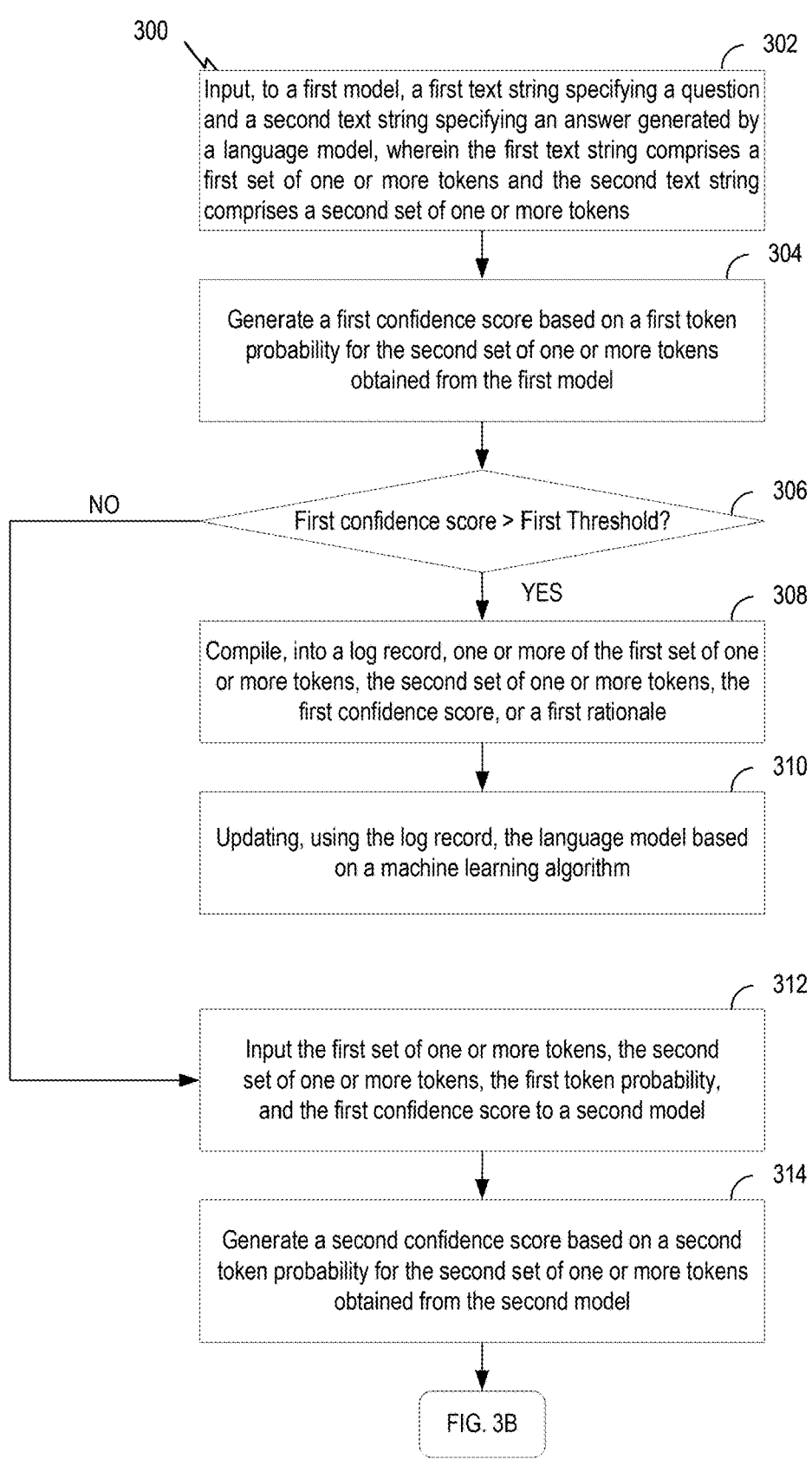
FIGS. 3A and 3B illustrate an example method for providing multi-tiered hierarchical language model judging, in accordance with aspects of the disclosure.
Figure 3B:
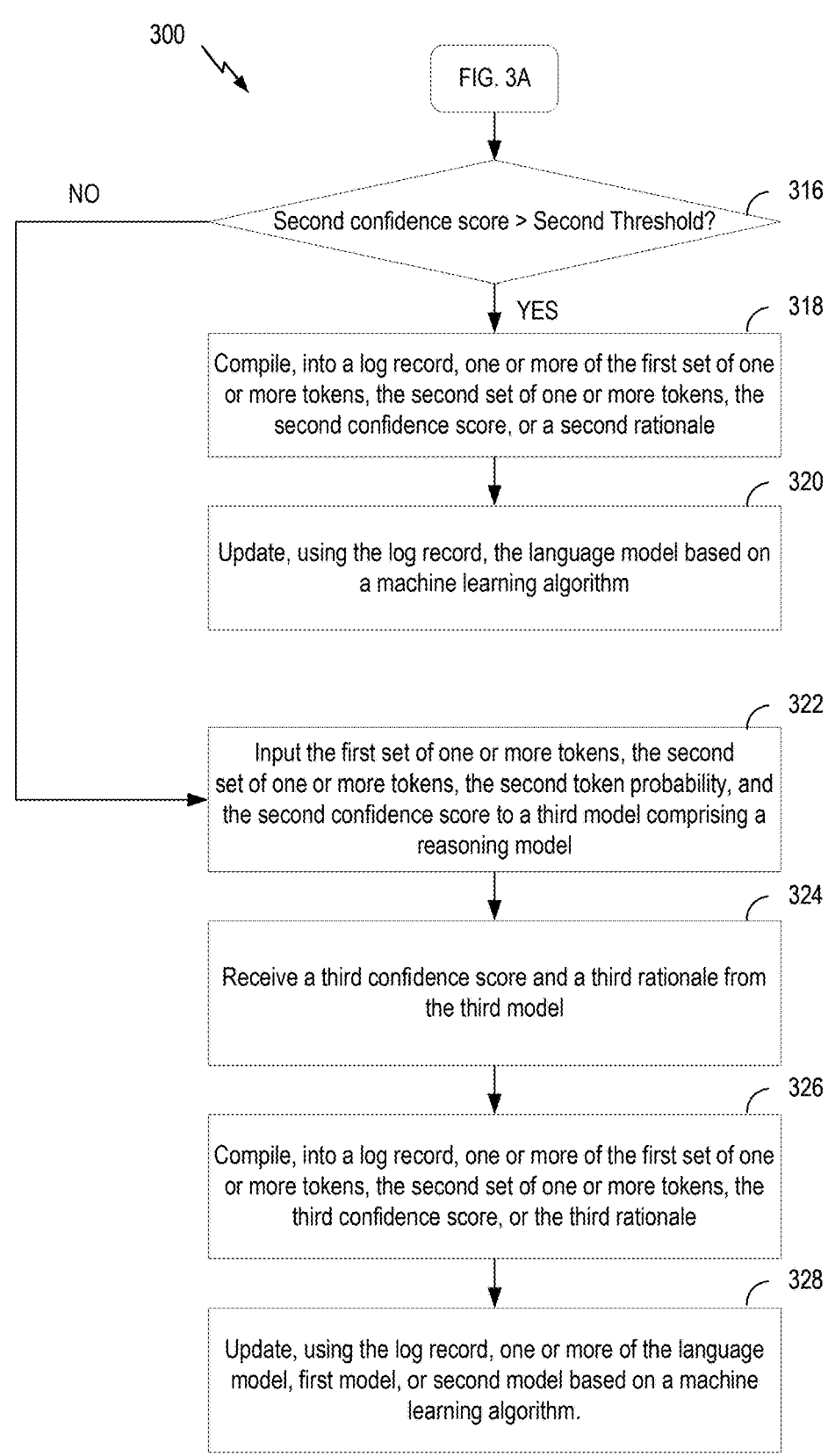

FIGS. 3A and 3B display a flow diagram of an example method 300 for providing multi-tiered hierarchical language model judging, in accordance with aspects of the disclosure. Method 300 may be performed by backend application 202, the language model 204, the first model 206, the second model 208, and the third model 210 of FIG. 2. However, method 300 is not limited to that embodiment.

Method 300 may begin with operation 302, which includes the backend application 202 inputting, to the first model 206, a first text string specifying a question and a second text string specifying an answer generated by the language model 204. In some aspects, the first text string may comprise a first set of one or more tokens and the second text string may comprise a second set of one or more tokens. Furthermore, in some aspects, operation 302 additionally includes the backend application 202 tokenizing the first text string into a first set of one or more tokens and the second text string into a second set of one or more tokens.

Operation 304 includes the backend application 202 generating a first confidence score based on a first token probability for the second set of one or more tokens obtained from the first model 206. As previously discussed, the first token probability may comprise a plurality of values, with each value corresponding to a token in the second set of one or more tokens and representing a likelihood that the token will be the next token given the preceding tokens in a sequence. In some aspects, the backend application 202 may generate the first confidence score by computing an average log-likelihood based on the first token probability, as described in Eq. 1. In other aspects, the backend application 202 may alternatively generate the first confidence score by computing a perplexity score based on the first token probability, as described in Eq. 2. Operation 304 may additionally include the backend application 202 generating a first rationale associated with the first confidence score. The first rationale may comprise an explanation of the first confidence score. For example, the first rationale may be a letter grade assigned to the answer based on the first confidence score. Alternatively, the first rationale may comprise a detailed explanation based on the first token probability. For example, the first rationale may identify token(s) in the second set of one or more tokens as positive or negative factor(s) contributing to the first confidence score. In other embodiments (not shown in FIG. 3A), operation 304 may alternatively include the backend application 202 receiving, from the first model 206, a first confidence score and a first rationale associated with the first confidence score that the first model 206 generates using the first set of one or more tokens and the second set of one or more tokens.

Operation 306 includes the backend application 202 determining whether the first confidence score satisfies a first threshold. If the first confidence score fails to satisfy the first threshold, method 300 may proceed to operation 312. However, if the first confidence score meets or exceeds the first threshold, method 300 may proceed to operation 308, which includes the backend application 202 compiling, into a log record, one or more of the first set of one or more tokens, the second set of one or more tokens, the first confidence score, or the first rationale. Afterwards, method 300 may proceed to operation 310, which includes the backend application 202 updating, using the log record, the language model 204 based on a machine learning algorithm, such as self-supervised learning or reinforcement learning.

Operation 312 includes the backend application 202 inputting the first set of one or more tokens and the second set of one or more tokens to the second model 208. In some aspects, the backend application 202 may additionally provide the first confidence score and the first rationale to the second model 208.

Operation 314 includes the backend application 202 generating a second confidence score based on a second token probability for the second set of one or more tokens obtained from the second model. The second token probability may comprise a plurality of values, with each value corresponding to a token in the second set of one or more tokens and representing a likelihood that the token will be the next token given the preceding tokens in a sequence. In some aspects, the backend application 202 may generate the second confidence score by computing an average log-likelihood based on the second token probability, as described in Eq. 1. In other aspects, the backend application 202 may alternatively generate the second confidence score by computing a perplexity score based on the second token probability, as described in Eq. 2. Operation 314 may additionally include the backend application 202 generating a second rationale associated with the second confidence score. Like the first rationale, the second rationale may comprise an explanation of the second confidence score. For example, the second rationale may be a letter grade assigned to the answer based on the second confidence score. Alternatively, the second rationale may comprise a detailed explanation based on the second token probability. For example, the second rationale may identify token(s) in the second set of one or more tokens as positive or negative factor(s) contributing to the second confidence score. In other embodiments (not shown in FIG. 3A), operation 314 may alternatively include the backend application 202 receiving, from the second model 208, a second confidence score and a second rationale associated with the second confidence score that the second model 208 generates using the first set of one or more tokens and the second set of one or more tokens.

Operation 316 includes the backend application 202 determining whether the second confidence score satisfies a second threshold. If the second confidence score fails to satisfy the second threshold, method 300 may proceed to operation 322. However, if the second confidence score satisfies the second threshold, method 300 may proceed to operation 318, which includes the backend application 202 compiling, into a log record, one or more of the first set of one or more tokens, the second set of one or more tokens, the second confidence score, or the second rationale. In some aspects, the backend application 202 may generate a more comprehensive log record that also includes one or more of the first confidence score or first rationale previously generated at operation 304. Afterwards, method 300 may proceed to operation 320, which includes the backend application 202 updating, using the log record, the language model 204 based on a machine learning algorithm, such as self-supervised learning or reinforcement learning. In some aspects, the machine learning algorithm may re-train the language model 204 using the second confidence score and/or second rationale.

Operation 322 includes the backend application 202 inputting the first set of one or more tokens and the second set of one or more tokens to a third model 210. In some aspects, the backend application 202 may additionally provide the second confidence score and the second rationale to the third model 210.

Operation 324 includes the backend application 202 receiving a third confidence score and a third rationale from the third model 210. Operation 326 further includes the backend application 202 compiling, into a log record, one or more of the first set of one or more tokens, the second set of one or more tokens, the third confidence score, or the third rationale. In some aspects, the backend application 202 may generate a more comprehensive log record that also includes one or more of the first confidence score, the first rationale associated with the first confidence score, the second confidence score, or the second rationale associated with the second confidence score previously generated during operations 304 and 314, respectively. Finally, operation 328 includes the backend application 202 updating, using the log record, the language model 204 based on a machine learning algorithm, such as self-supervised learning or reinforcement learning. In some aspects, the machine learning algorithm may re-train the language model using the third confidence score and/or third rationale.

Figure 4A:
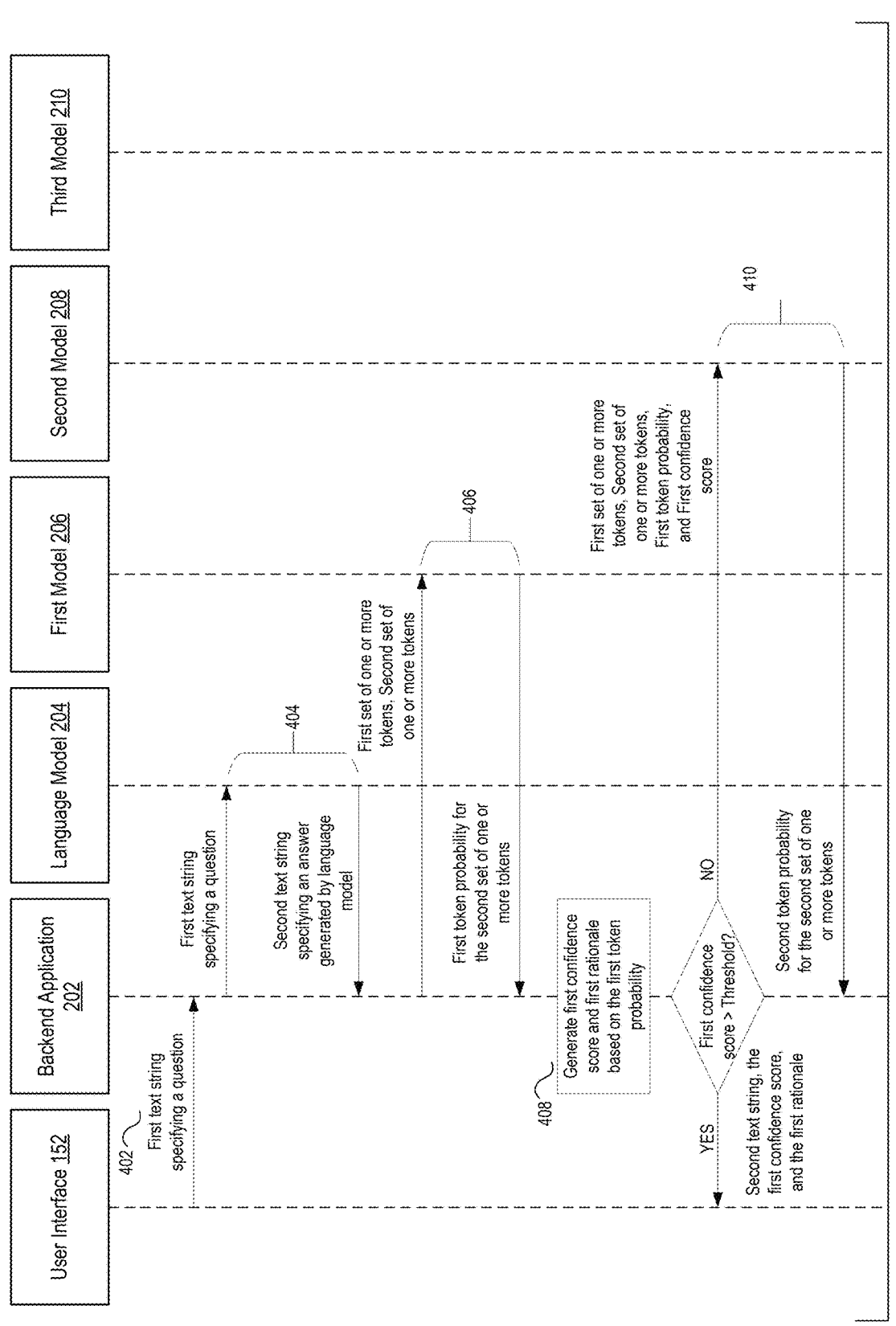
FIGS. 4A and 4B illustrate an example message flow between components of an example system for providing multi-tiered hierarchical language model judging, in accordance with aspects of the disclosure.
Figure 4B:
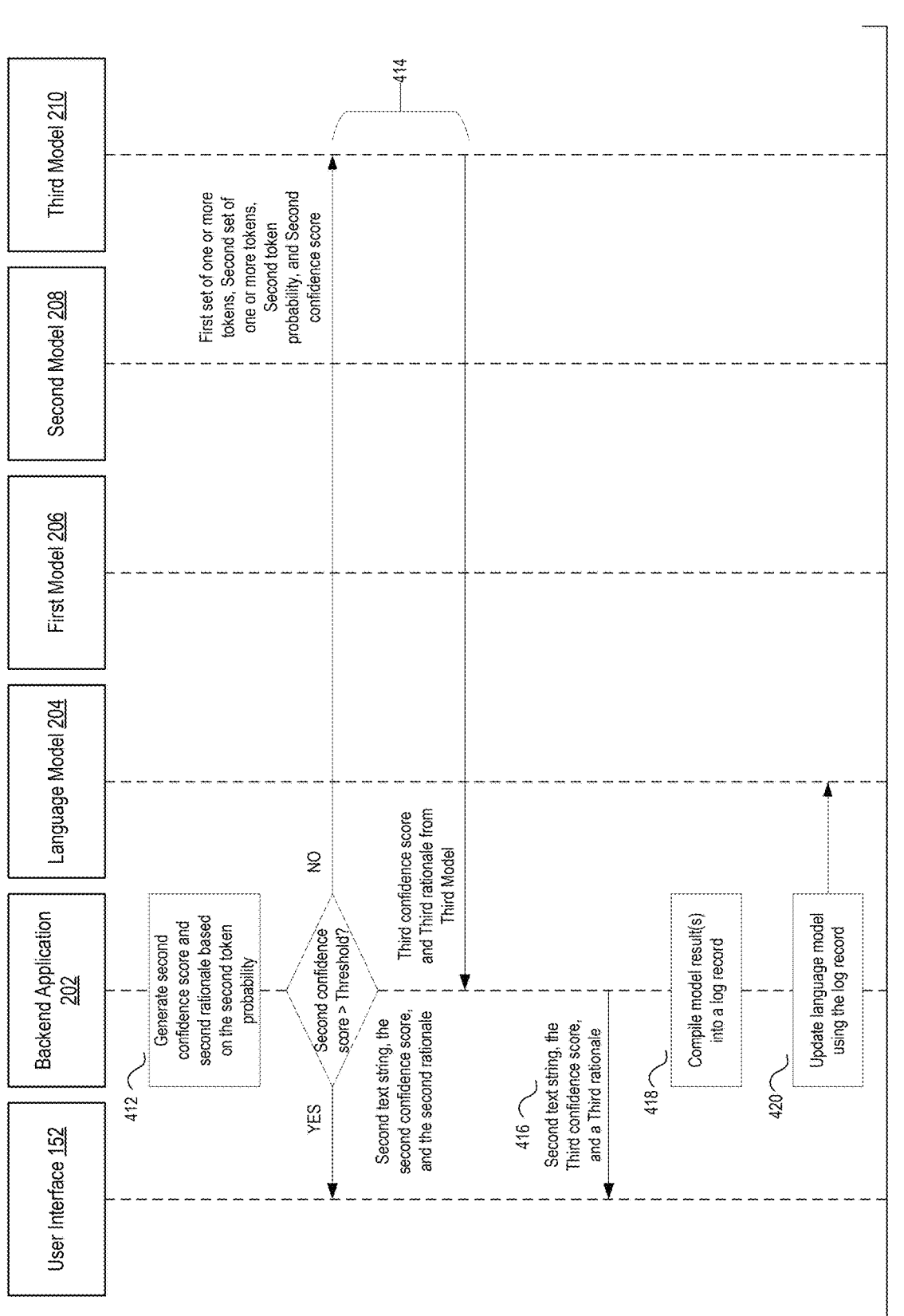

FIGS. 4A and 4B illustrate an example message flow diagram 400 between components of the example system 200 for providing multi-tiered hierarchical language model judging, in accordance with aspects of the disclosure. In some aspects, communication between the user interface 152 and the backend application 202 as well as between the backend application 202 and any one of the language model 204, the first model 206, the second model 208, or the third model 210 may be facilitated by one or more APIs.

Message flow diagram 400 may begin with message flow 402, which includes the backend application 202 receiving a first text string specifying a question from the user interface 152. Message flow 404 includes the backend application 202 forwarding the first text string to a language model 204, which may generate, based on the first text string, a second text string specifying an answer to the question. Message flow 404 also includes language model 204 transmitting the second text string to the backend application 202. Message flow 404 may further include the backend application 202 tokenizing the first text string into a first set of one or more tokens and tokenize the second text string into a second set of one or more tokens upon receiving the second text string from the language model 204.

Message flow 406 includes the backend application 202 transmitting the first set of one or more tokens and the second set of one or more tokens to the first model 206. Message flow 406 also includes the backend application 202 receiving a first token probability for the second set of one or more tokens from the first model 206. The first token probability may comprise a plurality of values, with each value corresponding to a token in the second set of one or more tokens and representing a likelihood that the token will be the next token given the preceding tokens in a sequence.

Message flow 408 includes the backend application 202 generating a first confidence score based on the first token probability. The backend application 202 may generate a first confidence score by computing one or more of a first average log-likelihood based on the first token probability, as described in Eq. 1, or a first perplexity score based on the first token probability, as described in Eq. 2. Message flow 408 may additionally include the backend application 202 generating a first rationale based on one or more of the first confidence score or the first token probability.

Message flow 410 includes the backend application 202 determining whether the first confidence score satisfies a first threshold. If the first confidence score satisfies (e.g., meets or exceeds) the first threshold, message flow 410 may include the backend application 202 transmitting the second text string, the first confidence score, and the first rationale to the user interface 152. Afterwards, the backend application 202 may proceed to execute message flow 418. If the first confidence score fails to satisfy the first threshold, message flow 410 may include the backend application 202 transmitting the first set of one or more tokens and the second set of one or more tokens to the second model 208. In some aspects (not shown in FIG. 4A), the backend application 202 may additionally transmit the first confidence score and the first rationale to the second model 208. Message flow 410 may further include the backend application 202 receiving a second token probability for the second set of one or more tokens from the second model 208.

Message flow 412 includes the backend application generating a second confidence score based on the second token probability. The backend application 202 may generate the second confidence score by computing one or more of a second average log-likelihood based on the second token probability, as described in Eq. 1, or a second perplexity score based on the second token probability, as described in Eq. 2. Message flow 408 may additionally include the backend application 202 generating a second rationale based on one or more of the second confidence score or the second token probability.

Message flow 414 includes the backend application 202 determining whether the second confidence score satisfies a second threshold, which may, in some embodiments, be set at a value equal to that of the first threshold. If the second confidence score meets or exceeds the second threshold, message flow 414 may include the backend application 202 transmitting the second text string, the second confidence score, and the second rationale to the user interface 152. Afterwards, the backend application 202 may proceed to execute message flow 418. If the second confidence score fails to satisfy the second threshold, message flow 414 may include the backend application 202 transmitting the first set of one or more tokens and the second set of one or more tokens to the third model 210. In some aspects (not shown in FIG. 4B), the backend application 202 may additionally transmit the second confidence score and the second rationale to the third model 210. Finally, message flow 414 may include the backend application 202 receiving a third confidence score and a third rationale from the third model 210.

Message flow 416 includes the backend application 202 transmitting the second text string, the third confidence score, and the third rationale to the user interface 152.

Message flow 418 includes the backend application 202 compiling one or more model result(s) into a log record. In some aspects, the backend application 202 may generate a comprehensive log record that includes the first text string, the second text string, every token probability, as well as every confidence score and associated rationale generated for the second set of one or more tokens. Alternatively, in other aspects, the backend application 202 may store, in the log record, the first text string, the second text string, the confidence score and associated rationale received, or generated using intermediate data, from the highest-tier model queried.

Message flow 420 includes the backend application 202 updating the language model 204 using the log record based on a machine learning algorithm. In some aspects, the machine learning algorithm may include self-supervised learning or reinforcement learning. The log record may be processed to extract training data, which may include, but is not limited to, an input-output pair (e.g., the first set of one or more tokens and the second set of one or more tokens) as well as the confidence score and rationale from the highest-tier model queried by backend application 202. A machine learning algorithm executes a training process that analyzes this extracted data to identify model deficiencies and areas for improvement. For example, the training process may apply supervised fine-tuning using high quality examples (e.g., input-output pairs with first, second, or third confidence scores exceeding a performance threshold separate from the first and second thresholds), reinforcement learning using a reward or penalty assigned to each input-output pair based on its first, second, or third confidence scores, or adversarial training using identified failure cases (e.g., input-output pairs with first, second, or third confidence scores that fail to satisfy a minimum threshold separate from the first and second thresholds). The machine learning algorithm re-trains language model 204 by generating updated model parameters based on the training data. The updated model is then deployed to replace or augment the existing language model, creating a feedback loop where operational performance data continuously informs model improvements without requiring manual data curation or complete retraining cycles.

Example Method for Providing Multi-Tiered Hierarchical Language Model Judging

FIGS. 5A and 5B depict an example method 500 for providing multi-tiered hierarchical language model judging. In one aspect, method 500 can be implemented by the system 600 of FIG. 6.

Method 500 begins at block 502 with inputting, to a first model having a first number of parameters, a first text string specifying a question from a user interface and a second text string specifying an answer generated by a language model, wherein the first text string comprises a first set of one or more tokens and the second text string comprises a second set of one or more tokens, as depicted and described with respect to operation 302 of FIG. 3A and message flow 406 of FIG. 4A.

Method 500 continues to block 504 with receiving, from the first model, a first token probability for the second set of one or more tokens, as depicted and described with respect to message flow 406 of FIG. 4A.

Method 500 continues to block 506 with generating a first confidence score based on the first token probability, wherein the first confidence score indicates a first quality judgment of the answer, as depicted and described with respect to operation 304 of FIG. 3A and message flow 408 of FIG. 4A.

Method 500 continues to block 508 with determining whether the first confidence score fails to satisfy a first threshold, as depicted and described with respect to operation 306 of FIG. 3A and message flow 410 of FIG. 4A. If the first confidence score satisfies the first threshold, method 500 continues to block 510 with outputting the second text string, the first confidence score, and a first rationale associated with the first confidence score to the user interface, as depicted and described with respect to message flow 410 of FIG. 4A.

Method 500 continues to block 512 with compiling, into a log record, one or more of the first set of one or more tokens, the second set of one or more tokens, the first confidence score, or the first rationale, as depicted and described with respect to operation 308 of FIG. 3A and message flow 418 of FIG. 4B.

Method 500 continues to block 514 with updating, using the log record, the language model based on a machine learning algorithm, as depicted and described with respect to operation 310 of FIG. 3A and message flow 420 of FIG. 4B.

If the first confidence score fails to satisfy the first threshold at block 508, method 500 continues to block 516, with inputting the first set of one or more tokens, the second set of one or more tokens, the first token probability, and the first confidence score to a second model different from the first model, wherein the second model has a second number of parameters greater than the first number of parameters, as depicted and described with respect to operation 312 of FIG. 3A and message flow 410 of FIG. 4A.

Method 500 continues to block 518, with receiving, from the second model, a second token probability for the second set of one or more tokens, as depicted and described with respect to operation 314 of FIG. 3A and message flow 410 of FIG. 4A.

Method 500 continues to block 520, with generating a second confidence score based on the second token probability, wherein the second confidence score indicates a second quality judgment of the answer, as depicted and described with respect to operation 314 of FIG. 3A and message flow 414 of FIG. 4B.

Method 500 continues to block 522, with compiling, into the log record, one or more of the first set of one or more tokens, the second set of one or more tokens, the second confidence score, or the second rationale, as depicted and described with respect to operation 318 of FIG. 3B and message flow 418 of FIG. 4B.

Method 500 continues to block 514 with updating, using the log record, the language model based on a machine learning algorithm, as depicted and described with respect to operation 310 of FIG. 3A and message flow 420 of FIG. 4B.

Note that the example method 500 in FIGS. 5A and 5B is just one example of a method, and other methods including fewer, additional, or alternative operations are possible consistent with this disclosure.

Figure 6:
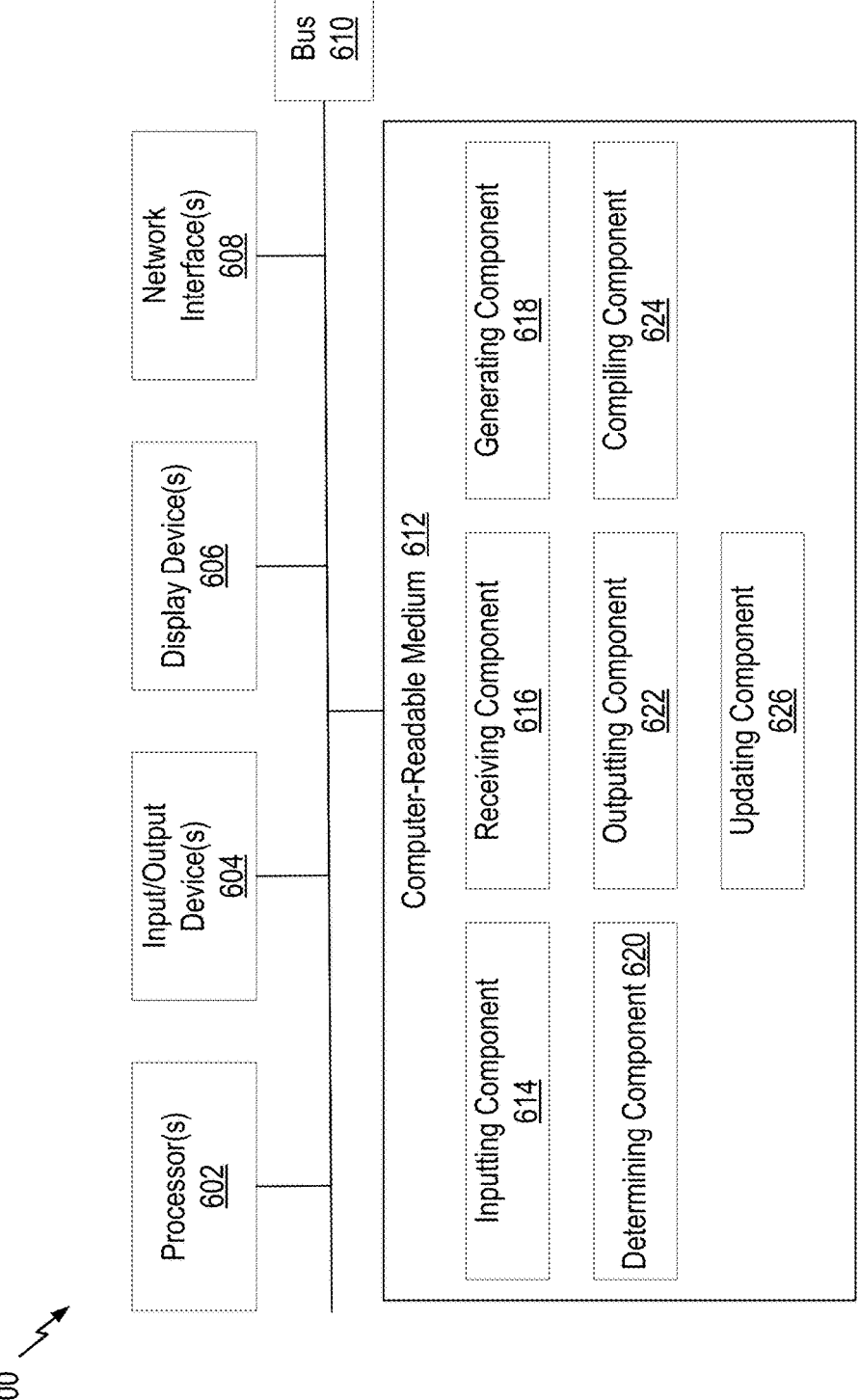
FIG. 6 illustrates an example processing system with which aspects of the second example method can be performed.

Example Processing System for Providing Multi-Tiered Hierarchical Language Model Judging FIG. 6 depicts an example processing system 600 configured to perform various aspects described herein, including, for example, method 500 as described above with respect to FIGS. 5A and 5B.

Processing system 600 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, one or more network interfaces 608 through which processing system 600 is connected to one or more networks (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain embodiments, processor(s) 602 are representative of one or more central processing units (CPUs), graphics processing unit (GPUs), tensor processing unit (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 616 may be configured to display a graphical user interface.

Network interface(s) 608 provide processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random access memory (RAM), or a nonvolatile memory, such as nonvolatile random access memory (NVRAM), or the like. In this example, computer-readable medium 612 includes inputting component 614, receiving component 616, generating component 618, determining component 620, outputting component 622, compiling component 624, and updating component 626. Processing of the components 614-626 may enable and cause the processing system 600 to perform the method 500 described with respect to FIGS. 5A-5B, or any aspect related to it.

In certain embodiments, inputting component 614 is configured to input, to a first model having a first number of parameters, a first text string specifying a question from a user interface and a second text string specifying an answer generated by a language model, wherein the first text string comprises a first set of one or more tokens and the second text string comprises a second set of one or more tokens, as depicted and described with respect to operation 302 of FIG. 3A, message flow 406 of FIG. 4A, and operation 502 of FIG. 5A. In certain embodiments, inputting component 614 is also configured to, if the first confidence score fails to satisfy the first threshold, input the first set of one or more tokens, the second set of one or more tokens, the first token probability, and the first confidence score to a second model different from the first model, wherein the second model has a second number of parameters greater than the first number of parameters, as depicted and described with respect to operation 312 of FIG. 3A, message flow 410 of FIG. 4A, and operation 516 of FIG. 5B.

In certain embodiments, receiving component 616 is configured to receive, from the first model, a first token probability for the second set of one or more tokens, as depicted and described with respect to message flow 406 of FIG. 4A and operation 504 of FIG. 5A. In certain embodiments, receiving component 616 is also configured to receive, from the second model, a second token probability for the second set of one or more tokens, as depicted and described with respect to operation 314 of FIG. 3A, message flow 410 of FIG. 4A, and operation 518 of FIG. 5B.

In certain embodiments, generating component 618 is configured to generate a first confidence score based on the first token probability, wherein the first confidence score indicates a first quality judgment of the answer, as depicted and described with respect to operation 304 of FIG. 3A, message flow 408 of FIG. 4A, and operation 506 of FIG. 5A. In certain embodiments, generating component 618 is also configured to generate a second confidence score based on the second token probability, wherein the second confidence score indicates a second quality judgment of the answer, as depicted and described with respect to operation 314 of FIG. 3A, message flow 414 of FIG. 4B, and operation 520 of FIG. 5B.

In certain embodiments, determining component 620 is configured to determine whether the first confidence score fails to satisfy a first threshold, as depicted and described with respect to operation 306 of FIG. 3A, message flow 410 of FIG. 4A, and operation 508 of FIG. 5A.

In certain embodiments, outputting component 622 is configured to output the second text string, the first confidence score, and a first rationale associated with the first confidence score to the user interface, as depicted and described with respect to message flow 410 of FIG. 4A.

In certain embodiments, compiling component 624 is configured to compile, into a log record, one or more of the first set of one or more tokens, the second set of one or more tokens, the first confidence score, or the first rationale, as depicted and described with respect to operation 308 of FIG. 3A, message flow 418 of FIG. 4B, and operation 512 of FIG. 5A. In certain embodiments, compiling component 624 is also configured to compile, into the log record, one or more of the first set of one or more tokens, the second set of one or more tokens, the second confidence score, or the second rationale, as depicted and described with respect to operation 318 of FIG. 3B, message flow 418 of FIG. 4B, and operation 522 of FIG. 5B.

In certain embodiments, updating component 626 is configured to update, using the log record, the language model based on a machine learning algorithm, as depicted and described with respect to operation 310 of FIG. 3A, message flow 420 of FIG. 4B, and operation 514 of FIG. 5A.

Note that FIG. 6 is just one example of a processing system consistent with aspects described herein, and other processing systems having additional, alternative, or fewer components are possible consistent with this disclosure.

Example Method for Providing Multi-Tiered Hierarchical Language Model Judging

FIG. 7 depicts an example method 700 for providing multi-tiered hierarchical language model judging. In some aspects, method 700 can be implemented by the system 800 of FIG. 8.

Method 700 begins at block 702 with inputting, to a first token probability model, a first text string specifying a question and a second text string specifying an answer generated by a language model, wherein the first text string comprises a first set of one or more tokens and the second text string comprises a second set of one or more tokens, as depicted and described with respect to operation 302 of FIG. 3A and message flow 406 of FIG. 4A.

Method 700 continues to block 704 with receiving, from the first token probability model, a first token probability for the second set of one or more tokens, as depicted and described with respect to message flow 406 of FIG. 4A.

Method 700 continues to block 706 with generating a first confidence score based on the first token probability, wherein the first confidence score indicates a first quality judgment of the answer, as depicted and described with respect to operation 304 of FIG. 3A and message flow 408 of FIG. 4A.

Method 700 continues to block 708 with determining whether the first confidence score satisfies a first threshold, as depicted and described with respect to operation 306 of FIG. 3A and message flow 410 of FIG. 4A.

If the first confidence score satisfies the first threshold, method 700 continues to block 710 with updating the language model, wherein: based on the first confidence score satisfying the first threshold, the updating comprises updating the language model using the first confidence score and a first rationale based on the token probability, as depicted and described with respect to operations 308 and 310 of FIG. 3A and message flows 418 and 420 of FIG. 4B. However, if the first confidence score fails to satisfy the first threshold, method 700 continues to block 712 with updating the language model, wherein: based on the first confidence score failing to satisfy the first threshold, update the language model using one or more of: a second confidence score and a second rationale, wherein the second confidence score is generated based on a second token probability for the second set of one or more tokens from a second token probability model and, wherein the second rationale is based on the second token probability, or a third confidence score and a third rationale from a second language model comprising a reasoning model, as depicted and described with respect to operations 318, 320, 324, 326, and 328 of FIG. 3B and message flows 418 and 420 of FIG. 4B.

Note that the example method 700 in FIG. 7 is just one example of a method, and other methods including fewer, additional, or alternative operations are possible consistent with this disclosure.

Figure 8:
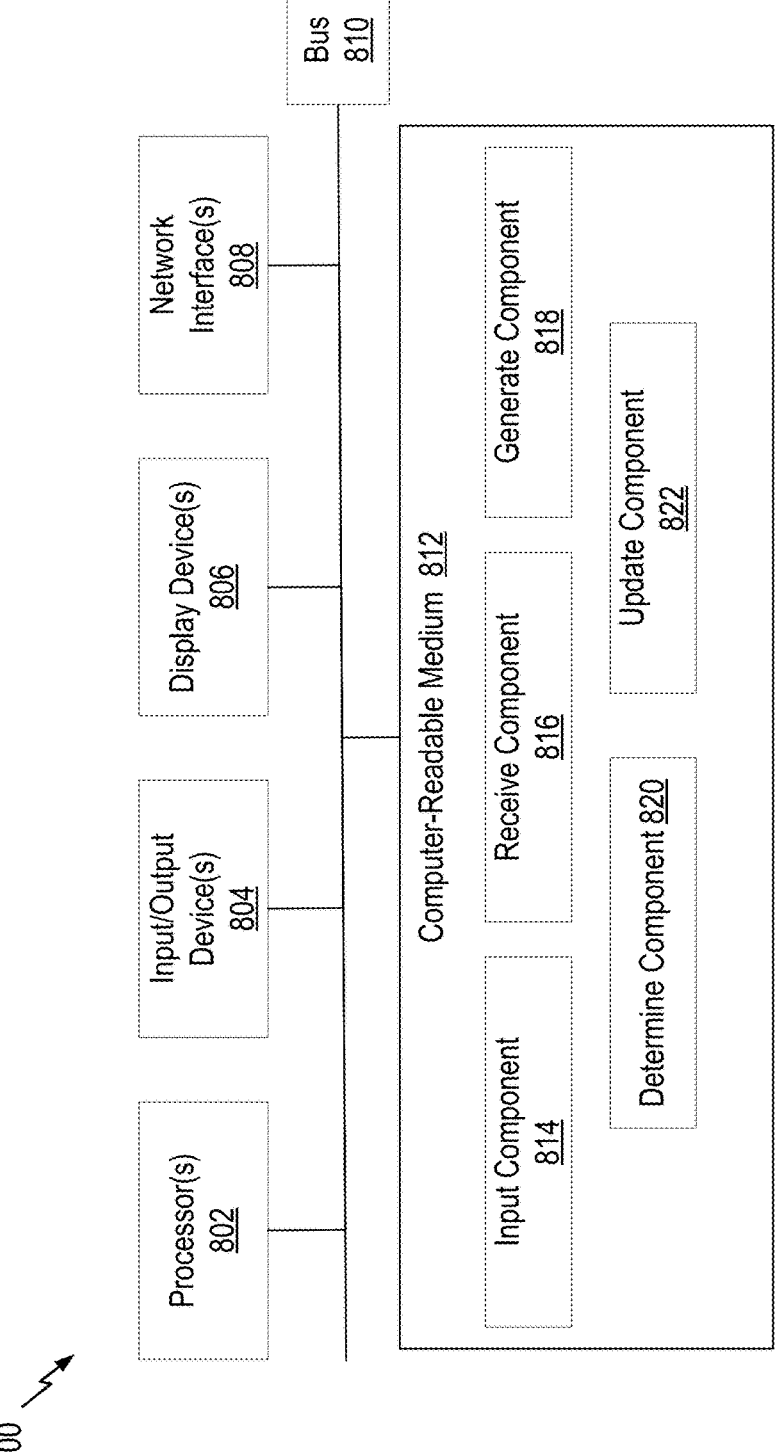
FIG. 8 illustrates an example processing system with which aspects of the third example method can be performed.

Example Processing System for Providing Multi-Tiered Hierarchical Language Model Judging FIG. 8 depicts an example processing system 800 configured to perform various aspects described herein, including, for example, method 700 as described above with respect to FIG. 7.

Processing system 800 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 610 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 816 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes input component 814, receive component 816, generate component 818, determine component 820, and updating component 822. Processing of the components 814-822 may enable and cause the processing system 800 to perform the method 700 described with respect to FIG. 7, or any aspect related to it.

In certain embodiments, input component 814 is configured to input, to a first token probability model, a first text string specifying a question and a second text string specifying an answer generated by a language model, wherein the first text string comprises a first set of one or more tokens and the second text string comprises a second set of one or more tokens, as depicted and described with respect to operation 302 of FIG. 3A, message flow 406 of FIG. 4A, and operation 702 of FIG. 7.

In certain embodiments, receive component 816 is configured to receive, from the first toke probability model, a first token probability for the second set of one or more tokens, as depicted and described with respect to message flow 406 of FIG. 4A and operation 704 of FIG. 7.

In certain embodiments, generate component 818 is configured to generate a first confidence score based on the first token probability, wherein the first confidence score indicates a first quality judgment of the answer, as depicted and described with respect to operation 304 of FIG. 3A, message flow 408 of FIG. 4A, and operation 706 of FIG. 7.

In certain embodiments, determine component 820 is configured to determine whether the first confidence score satisfies a first threshold, as depicted and described with respect to operation 306 of FIG. 3A, message flow 410 of FIG. 4A, and operation 708 of FIG. 7.

In certain embodiments, update component 822 is configured to update the language model. If the first confidence score satisfies the first threshold, the update component 822 is configured to update the language model using the first confidence score and a first rationale based on the token probability, as depicted and described with respect to operations 308 and 310 of FIG. 3A and message flows 418 and 420 of FIG. 4B, and operation 710 of FIG. 7. If the first confidence score fails to satisfy the first threshold, the update component 822 is configured to update the language model using one or more of: a second confidence score and a second rationale, wherein the second confidence score is generated based on a second token probability for the second set of one or more tokens from a second token probability model and, wherein the second rationale is based on the second token probability, or a third confidence score and a third rationale from a second language model comprising a reasoning model, as depicted and described with respect to operations 318, 320, 324, 326, and 328 of FIG. 3B, message flows 418 and 420 of FIG. 4B, and operation 712 of FIG. 7.

Note that FIG. 8 is just one example of a processing system consistent with aspects described herein, and other processing systems having additional, alternative, or fewer components are possible consistent with this disclosure.

Example Method for Providing Multi-Tiered Hierarchical Language Model Judging

FIGS. 9A and 9B depicts an example method 900 for providing multi-tiered hierarchical language model judging. In one aspect, method 9800 can be implemented by the system 1000 of FIG. 10.

Method 900 begins at block 902 with inputting, to a first model, a first text string specifying a question from a user interface and a second text string specifying an answer generated by a language model, wherein the first text string comprises a first set of one or more tokens and the second text string comprises a second set of one or more tokens, as depicted and described with respect to operation 302 of FIG. 3A and message flow 406 of FIG. 4A.

Method 900 continues to block 904, with generating a first confidence score based on a first token probability for the second set of one or more tokens obtained from the first model, as depicted and described with respect to operation 304 of FIG. 3A and message flow 408 of FIG. 4A.

Method 900 continues to block 906, with determining the first confidence score fails to satisfy a first threshold, as depicted and described with respect to operation 306 of FIG. 3A and message flow 410 of FIG. 4A.

Method 900 continues to block 908, with inputting, based on the first confidence score failing to satisfy the first threshold, the first set of one or more tokens, the second set of one or more tokens, the first token probability, and the first confidence score to a second model different from the first model, as depicted and described with respect to operation 312 of FIG. 3A and message flow 410 of FIG. 4A.

Method 900 continues to block 910, with generating a second confidence score based on a second token probability for the second set of one or more tokens obtained from the second model, as depicted and described with respect to operation 314 of FIG. 3A and message flow 412 of FIG. 4B.

Method 900 continues to block 912, with inputting, based on the second confidence score failing to satisfy the second threshold, the first set of one or more tokens, the second set of one or more tokens, the second token probability, and the second confidence score to a third model comprising a reasoning model, as depicted and described with respect to operations 316 and 322 of FIG. 3B and message flow 414 of FIG. 4B.

Method 900 continues to block 914, with receiving, from the reasoning model, a third confidence score and a third rationale, as depicted and described with respect to operation 324 of FIG. 3B and message flow 414 of FIG. 4B.

Method 900 continues to block 916, with compiling, into a log record, one or more of the first set of one or more tokens, the second set of one or more tokens, the third confidence score, or a third rationale, as depicted and described with respect to operation 326 of FIG. 3B and message flow 418 of FIG. 4B.

Finally, method 900 continues to block 918, with updating, using the log record, the language model based on a machine learning algorithm, as depicted and described with respect to operation 328 of FIG. 3B and message flow 420 of FIG. 4B.

Note that the example method 900 in FIGS. 9A and 9B is just one example of a method, and other methods including fewer, additional, or alternative operations are possible consistent with this disclosure.

Figure 10:
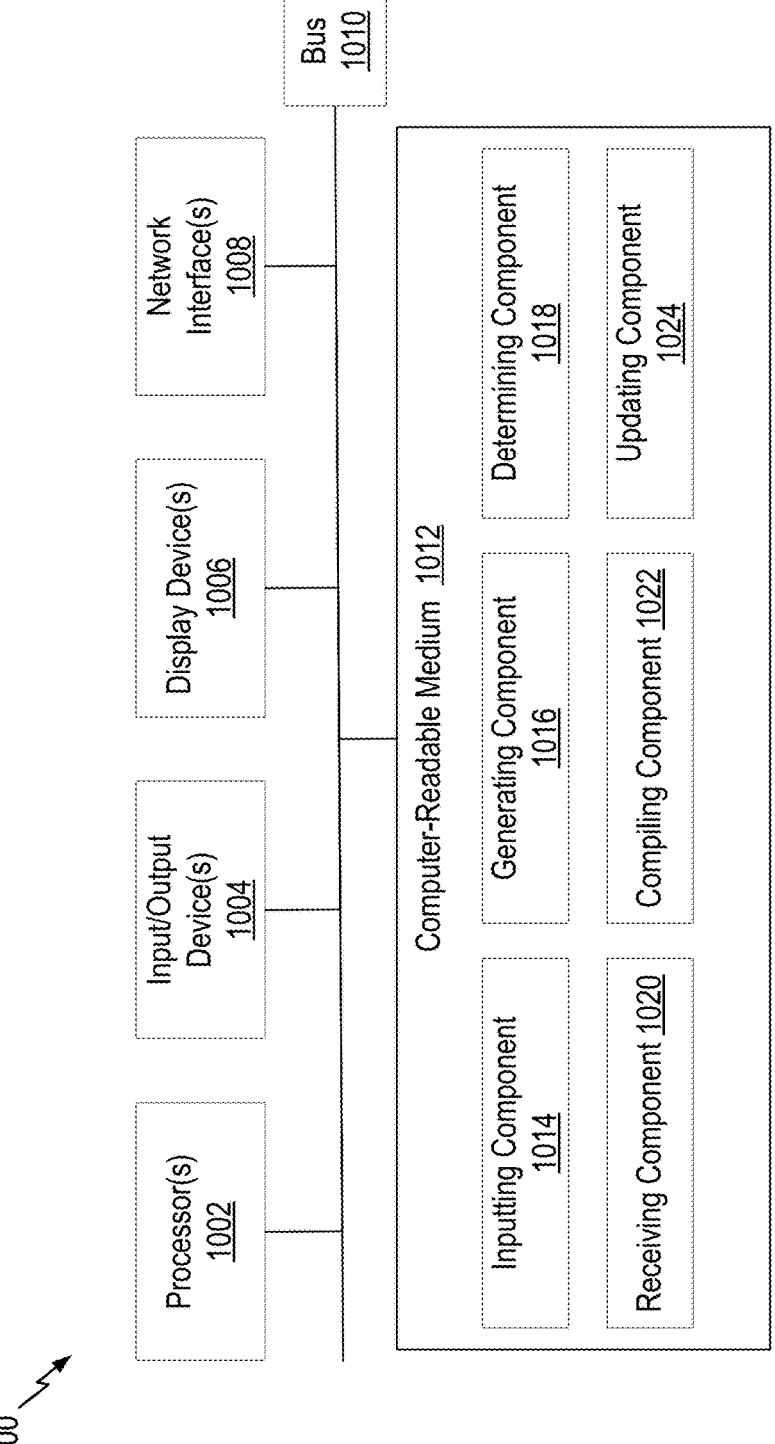
FIG. 10 illustrates an example processing system with which aspects of the fourth example method can be performed.

Example Processing System for Providing Multi-Tiered Hierarchical Language Model Judging FIG. 10 depicts an example processing system 1000 configured to perform various aspects described herein, including, for example, method 900 as described above with respect to FIGS. 9A and 9B.

Processing system 1000 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1000 includes one or more processors 1002, one or more input/output devices 1004, one or more display devices 1006, one or more network interfaces 1008 through which processing system 1000 is connected to one or more networks (e.g., a local network, an intranet, the Internet, or any other group of processing systems communicatively connected to each other), and computer-readable medium 1012. In the depicted example, the aforementioned components are coupled by a bus 1010, which may generally be configured for data exchange amongst the components. Bus 1010 may be representative of multiple buses, while only one is depicted for simplicity.

Processor(s) 1002 are generally configured to retrieve and execute instructions stored in one or more memories, including local memories like computer-readable medium 1012, as well as remote memories and data stores. Similarly, processor(s) 1002 are configured to store application data residing in local memories like the computer-readable medium 1012, as well as remote memories and data stores. More generally, bus 1010 is configured to transmit programming instructions and application data among the processor(s) 1002, display device(s) 1006, network interface(s) 1008, and/or computer-readable medium 1012. In certain embodiments, processor (s) 1002 are representative of one or more central processing units (CPUs), graphics processing unit (GPUs), tensor processing unit (TPUs), accelerators, and other processing devices.

Input/output device(s) 1004 may include any device, mechanism, system, interactive display, and/or various other hardware and software components for communicating information between processing system 1000 and a user of processing system 1000. For example, input/output device (s) 1004 may include input hardware, such as a keyboard, touch screen, button, microphone, speaker, and/or other device for receiving input from the user and sending outputs to the user.

Display device(s) 1006 may generally include any sort of device configured to display data, information, graphics, user interface elements, and the like to a user. For example, display device(s) 1006 may include internal and external displays such as an internal display of a tablet computer or an external display for a server computer or a projector. Display device(s) 1006 may further include displays for devices, such as augmented, virtual, and/or extended reality devices. In various embodiments, display device(s) 1016 may be configured to display a graphical user interface.

Network interface(s) 1008 provide processing system 1000 with access to external networks and thereby to external processing systems. Network interface(s) 1008 can generally be any hardware and/or software capable of transmitting and/or receiving data via a wired or wireless network connection. Accordingly, network interface(s) 1008 can include a communication transceiver for sending and/or receiving any wired and/or wireless communication.

Computer-readable medium 1012 may be a volatile memory, such as a random access memory (RAM), or a nonvolatile memory, such as nonvolatile random access memory (NVRAM), or the like. In this example, computer-readable medium 1012 includes inputting component 1014, generating component 1016, determining component 1018, receiving component 1020, compiling component 1022, and updating component 1024. Processing of the components 1014-1024 may enable and cause the processing system 1000 to perform the method 900 described with respect to FIGS. 9A and 9B, or any aspect related to it.

In certain embodiments, inputting component 1014 is configured to input, to a first model, a first text string specifying a question from a user interface and a second text string specifying an answer generated by a language model, wherein the first text string comprises a first set of one or more tokens and the second text string comprises a second set of one or more tokens, as depicted and described with respect to operation 302 of FIG. 3A, message flow 406 of FIG. 4A, and operation 902 of FIG. 9A. In certain embodiments, inputting component 1014 is also configured to input, based on the first confidence score failing to satisfy the first threshold, the first set of one or more tokens, the second set of one or more tokens, the first token probability, and the first confidence score to a second model different from the first model, as depicted and described with respect to operation 312 of FIG. 3A, message flow 410 of FIG. 4A, and operation 908 of FIG. 9A. In certain embodiments, inputting component 1014 is further configured to input, based on the second confidence score failing to satisfy the second threshold, the first set of one or more tokens, the second set of one or more tokens, the second token probability, and the second confidence to a third model comprising a reasoning model, as depicted and described with respect to operation 322 of FIG. 3B, message flow 414 of FIG. 4B, and operation 912 of FIG. 9B.

In certain embodiments, generating component 1016 is configured to generate a first confidence score based on a first token probability for the second set of one or more tokens obtained from the first model, as depicted and described with respect to operation 304 of FIG. 3A, message flow 408 of FIG. 4A, and operation 904 of FIG. 9A. In certain embodiments, generate component 1016 is also configured to generate a second confidence score based on a second token probability for the second set of one or more tokens obtained from the second model, as depicted and described with respect to operation 314 of FIG. 3A, message flow 412 of FIG. 4B, and operation 910 of FIG. 9A.

In certain embodiments, determining component 1018 is configured to determine the first confidence score fails to satisfy a first threshold, as depicted and described with respect to operation 306 of FIG. 3A, message flow 410 of FIG. 4A, and operation 906 of FIG. 9A. In certain embodiments, receiving component 1020 is configured to receive, from the reasoning model, a third confidence score and a third rationale, as depicted and described with respect to operation 324 of FIG. 3B and message flow 414 of FIG. 4B, and operation 914 of FIG. 9B. In certain embodiments, compiling component 1022 is configured to compile, into a log record, one or more of the first set of one or more tokens, the second set of one or more tokens, the third confidence score, or the third rationale, as depicted and described with respect to operation 326 of FIG. 3B, message flow 418 of FIG. 4B, and operation 916 of FIG. 9B. In certain embodiments, updating component 1024 is configured to update, using the log record, the language model based on a machine learning algorithm, as depicted and described with respect to operation 328 of FIG. 3B. Message flow 420 of FIG. 4B, and operation 918 of FIG. 9B.

Note that FIG. 10 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method, comprising: inputting, to a first model having a first number of parameters, a first text string specifying a question from a user interface and a second text string specifying an answer generated by a language model, wherein the first text string comprises a first set of one or more tokens and the second text string comprises a second set of one or more tokens; receiving, from the first model, a first token probability for the second set of one or more tokens; generating a first confidence score based on the first token probability, wherein the first confidence score indicates a first quality judgment of the answer; determining whether the first confidence score satisfies a first threshold; if the first confidence score satisfies the first threshold: outputting the second text string, the first confidence score, and a first rationale associated with the first confidence score to the user interface, and compiling, into a log record, one or more of the first set of one or more tokens, the second set of one or more tokens, the first confidence score, or the first rationale, or if the first confidence score fails to satisfy the first threshold: inputting the first set of one or more tokens, the second set of one or more tokens, the first token probability, and the first confidence score to a second model different from the first model, wherein the second model has a second number of parameters greater than the first number of parameters, receiving, from the second model, a second token probability for the second set of one or more tokens, generating a second confidence score based on the second token probability, wherein the second confidence score indicates a second quality judgment of the answer, and compiling, into the log record, one or more of the first set of one or more tokens, the second set of one or more tokens, the second confidence score, or a second rationale; and updating, using the log record, the language model based on a machine learning algorithm.

Clause 2: The method of clause 1, wherein the first rationale is based on the first token probability, and wherein the second rationale is based on the second token probability.

Clause 3: The method of clauses 1-2, further comprising: determining the second confidence score satisfies a second threshold; and outputting the second text string, the second confidence score, and a second rationale associated with the second confidence score for the user interface.

Clause 4: The method of clauses 1-2, further comprising: determining the second confidence score fails to satisfy a second threshold; inputting the first set of one or more tokens, the second set of one or more tokens, the second token probability, and the second confidence score to a third model different from the first model and the second model; and receiving, from the third model, a third confidence score and a third rationale associated with the third confidence score; and outputting the second text string, the third confidence score, and the third rationale to the user interface.

Clause 5: The method of clause 4, further comprising: compiling, into the log record, one or more of the first set of one or more tokens, the second set of one or more tokens, the third confidence score or the third rationale; and updating, using the log record, one or more of the first model or the second model based on the machine learning algorithm.

Clause 6: The method of clause 4, wherein the third model has a third number of parameters greater than the second number of parameters.

Clause 7: The method of clauses 1-6, wherein the first model comprises a first token probability model, and wherein the second model comprises a second token probability model.

Clause 8: The method of clauses 1-7, wherein the first number of parameters is fewer than 10 billion parameters, and the second number of parameters is greater than 20 billion parameters.

Clause 9: The method of clauses 1-8, wherein generating the first confidence score further comprises one or more of: computing a first average log-likelihood based on the first token probability; or computing a first perplexity score based on the first token probability.

Clause 10: The method of clauses 1-9, wherein generating the second confidence score further comprises one or more of: computing a second average log-likelihood based on the second token probability; or computing a second perplexity score based on the second token probability.

Clause 11: An apparatus comprising a processing system that includes one or more processors and one or more memories coupled with the one or more processors, the processing system configured to: input, to a first token probability model, a first text string specifying a question and a second text string specifying an answer generated by a first language model, wherein the first text string comprises a first set of one or more tokens and the second text string comprises a second set of one or more tokens; receive, from the first token probability model, a first token probability for the first set of one or more tokens; generate a first confidence score based on the first token probability; determine whether the first confidence score satisfies a first threshold; and update the language model, wherein the processing system is configured to: based on the first confidence score satisfying the first threshold, update the language model using the first confidence score and a first rationale based on the first token probability, or based on the first confidence score failing to satisfy the first threshold, update the language model using one or more of: a second confidence score and a second rationale, wherein the second confidence score is generated based on a second token probability for the second set of one or more tokens from a second token probability model and, wherein the second rationale is based on the second token probability, or a third confidence score and a third rationale from a second language model comprising a reasoning model.

Clause 12: The apparatus of clause 11, wherein the processing system is further configured to generate the first confidence by computing one or more of a first average log-likelihood based on the first token probability or a first perplexity score based on the first token probability.

Clause 13: The apparatus of clauses 11-12, wherein the processing system is further configured to generate the second confidence score by computing one or more of a second average log-likelihood based on the second token probability or a second perplexity score based on the second token probability.

Clause 14: The apparatus of clauses 11-13, wherein the processing system is further configured to update the language model using a machine learning algorithm, and wherein the machine learning algorithm comprises applying reinforcement learning.

Clause 15: The apparatus of clauses 11-14, wherein the processing system is further configured to output, to a user interface, the second text string and one or more of the first confidence score, the first rationale, the second confidence score, the second rationale, the third confidence score, or the third rationale.

Clause 16: A method, comprising: inputting, to a first model, a first text string specifying a question from a user interface and a second text string specifying an answer generated by a language model, wherein the first text string comprises a first set of one or more tokens and the second text string comprises a second set of one or more tokens; generating a first confidence score based on a first token probability for the second set of one or more tokens obtained from the first model; determining the first confidence score fails to satisfy a first threshold; inputting, based on the first confidence score failing to satisfy the first threshold, the first set of one or more tokens, the second set of one or more tokens, the first token probability, and the first confidence score to a second model different from the first model; generating a second confidence score based on a second token probability for the second set of one or more tokens obtained from the second model; determining the second confidence score fails to satisfy a second threshold; inputting, based on the second confidence score failing to satisfy the second threshold, the first set of one or more tokens, the second set of one or more tokens, the second token probability, and the second confidence score to a third model comprising a reasoning model; receiving, from the reasoning model, a third confidence score and a third rationale; compiling, into a log record, one or more of the first set of one or more tokens, the second set of one or more tokens, the third confidence score, or third rationale; and updating, using the log record, the language model based on a machine learning algorithm.

Clause 17: The method of clause 16, wherein generating the first confidence score further comprises one or more of: computing a first average log-likelihood based on the first token probability; or computing a first perplexity score based on the first token probability.

Clause 18: The method of clauses 16-17, wherein generating the second confidence score further comprises one or more of: computing a second average log-likelihood based on the second token probability; or computing a second perplexity score based on the second token probability.

Clause 19: The method of clauses 16-18, wherein the machine learning algorithm comprises applying self-supervised learning based on the log record.

Clause 20: The method of clauses 16-19, further comprising outputting, to the user interface, the second text string and one or more of the first confidence score, a first rationale, the second confidence score, a second rationale, the third confidence score, or the third rationale.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
inputting, to a first model having a first number of parameters, a first text string specifying a question from a user interface and a second text string specifying an answer generated by a language model, wherein the first text string comprises a first set of one or more tokens and the second text string comprises a second set of one or more tokens;
receiving, from the first model, a first token probability for the second set of one or more tokens, wherein the first token probability comprises a first plurality of values derived by the first model and wherein each value of the first plurality of values represents a likelihood that a token in the second set of one or more tokens is a next token based on a preceding sequence of tokens in the second set of one or more tokens;
generating a first confidence score based on the first token probability, wherein the first confidence score indicates a first quality judgment of the answer;
determining whether the first confidence score satisfies a first threshold;
if the first confidence score satisfies the first threshold:

outputting the second text string, the first confidence score, and a first rationale associated with the first confidence score to the user interface, and compiling, into a log record, one or more of the first set of one or more tokens, the second set of one or more tokens, the first confidence score, or the first rationale, or if the first confidence score fails to satisfy the first threshold:

inputting the first set of one or more tokens, the second set of one or more tokens, the first token probability, and the first confidence score to a second model different from the first model, wherein the second model has a second number of parameters greater than the first number of parameters, receiving, from the second model, a second token probability for the second set of one or more tokens, wherein the second token probability comprises a second plurality of values derived by the second model, and wherein each value of the second plurality of values represents an updated likelihood that the token in the second set of one or more tokens is the next token based on the preceding sequence of tokens in the second set of one or more tokens, generating a second confidence score based on the second token probability, wherein the second confidence score indicates a second quality judgment of the answer, and compiling, into the log record, one or more of the first set of one or more tokens, the second set of one or more tokens, the second confidence score, or a second rationale; and updating, using the log record, the language model based on a machine learning algorithm.

2. The method of claim 1, wherein the first rationale is based on the first token probability, and wherein the second rationale is based on the second token probability.

3. The method of claim 1, further comprising:

determining the second confidence score satisfies a second threshold; and outputting the second text string, the second confidence score, and the second rationale associated with the second confidence score for the user interface.

4. The method of claim 1, further comprising:

determining the second confidence score fails to satisfy a second threshold;

inputting the first set of one or more tokens, the second set of one or more tokens, the second token probability, and the second confidence score to a third model different from the first model and the second model;

receiving, from the third model, a third confidence score and a third rationale associated with the third confidence score; and outputting the second text string, the third confidence score, and the third rationale to the user interface.

5. The method of claim 4, further comprising:

compiling, into the log record, one or more of the first set of one or more tokens, the second set of one or more tokens, the third confidence score or the third rationale; and updating, using the log record, one or more of the first model or the second model based on the machine learning algorithm.

6. The method of claim 4, wherein the third model has a third number of parameters greater than the second number of parameters.

7. The method of claim 1, wherein the first model comprises a first token probability model, and wherein the second model comprises a second token probability model.

8. The method of claim 1, wherein the first number of parameters is fewer than 10 billion parameters, and the second number of parameters is greater than 20 billion parameters.

9. The method of claim 1, wherein generating the first confidence score further comprises one or more of:

computing a first average log-likelihood based on the first token probability; or computing a first perplexity score based on the first token probability.

10. The method of claim 1, wherein generating the second confidence score further comprises one or more of:

computing a second average log-likelihood based on the second token probability; or computing a second perplexity score based on the second token probability.

11. An apparatus comprising a processing system that includes one or more processors and one or more memories coupled with the one or more processors and configured to cause the processing system to:

input, to a first token probability model, a first text string specifying a question and a second text string specifying an answer generated by a language model, wherein the first text string comprises a first set of one or more tokens and the second text string comprises a second set of one or more tokens;

receive, from the first token probability model, a first token probability for the first second set of one or more tokens, wherein the first token probability comprises a first plurality of values derived by the first token probability model, and wherein each value of the first plurality of values represents a likelihood that a token in the second set of one or more tokens is a next token based on a preceding sequence of tokens in the second set of one or more tokens;

generate a first confidence score based on the first token probability;

determine whether the first confidence score satisfies a first threshold; and update the language model, wherein the processing system is configured to:

based on the first confidence score satisfying the first threshold, update the language model using the first confidence score and a first rationale based on the first token probability, or based on the first confidence score failing to satisfy the first threshold, update the language model using one or more of:

a second confidence score and a second rationale, wherein the second confidence score is generated based on a second token probability for the second set of one or more tokens from a second token probability model, wherein the second token probability comprises a second plurality of values derived by the second token probability model, and wherein each value of the second plurality of values represents an updated likelihood that the token in the second set of one or more tokens is the next token based on the preceding sequence of tokens in the second set of one or more tokens and, wherein the second rationale is based on the second token probability, or a third confidence score and a third rationale from a second language model comprising a reasoning model.

12. The apparatus of claim 11, wherein the processing system is further configured to generate the first confidence score by computing one or more of a first average log-likelihood based on the first token probability or a first perplexity score based on the first token probability.

13. The apparatus of claim 11, wherein the processing system is further configured to generate the second confidence score by computing one or more of a second average log-likelihood based on the second token probability or a second perplexity score based on the second token probability.

14. The apparatus of claim 11, wherein the processing system is further configured to update the language model using a machine learning algorithm, and wherein the machine learning algorithm comprises reinforcement learning.

15. The apparatus of claim 11, wherein the processing system is further configured to output, to a user interface, the second text string and one or more of the first confidence score, the first rationale, the second confidence score, the third confidence score, or the third rationale.

16. A method, comprising:

inputting, to a first model, a first text string specifying a question from a user interface and a second text string specifying an answer generated by a language model, wherein the first text string comprises a first set of one or more tokens and the second text string comprises a second set of one or more tokens;

generating a first confidence score based on a first token probability for the second set of one or more tokens obtained from the first model, wherein the first token probability comprises a first plurality of values derived by the first model, and wherein each value of the first plurality of values represents a likelihood that a token in the second set of one or more tokens is a next token based on a preceding sequence of tokens in the second set of one or more tokens;

determining the first confidence score fails to satisfy a first threshold;

inputting, based on the first confidence score failing to satisfy the first threshold, the first set of one or more tokens, the second set of one or more tokens, the first token probability, and the first confidence score to a second model different from the first model;

generating a second confidence score based on a second token probability for the second set of one or more tokens obtained from the second model, wherein the second token probability comprises a second plurality of values derived by the second model, and wherein each value of the second plurality of values represents an updated likelihood that the token in the second set of one or more tokens is the next token based on the preceding sequence of tokens in the second set of one or more tokens;

determining the second confidence score fails to satisfy a second threshold;

inputting, based on the second confidence score failing to satisfy the second threshold, the first set of one or more tokens, the second set of one or more tokens, the second token probability, and the second confidence score to a third model comprising a reasoning model;

receiving, from the reasoning model, a third confidence score and a third rationale;

compiling, into a log record, one or more of the first set of one or more tokens, the second set of one or more tokens, the third confidence score, or the third rationale; and updating, using the log record, the language model based on a machine learning algorithm.

17. The method of claim 16, wherein generating the first confidence score further comprises one or more of:

computing one or more of a first average log-likelihood based on the first token probability; or computing a first perplexity score based on the first token probability.

18. The method of claim 16, wherein generating the second confidence score further comprises one or more:

computing a second average log-likelihood based on the second token probability; or computing a second perplexity score based on the second token probability.

19. The method of claim 16, wherein the machine learning algorithm comprises applying reinforcement learning based on the log record.

20. The method of claim 16, further comprises outputting, to the user interface, the second text string and one or more of the first confidence score, a first rationale, the second confidence score, a second rationale, the third confidence score, or the third rationale.

* * * * *